(12) United States Patent
Ogata et al.

(10) Patent No.: US 9,989,148 B2
(45) Date of Patent: Jun. 5, 2018

(54) HYDRAULIC CONTROL SYSTEM FOR VEHICLES

(71) Applicant: TOYOTA JIDOSHA KABUSHIKI KAISHA, Aichi (JP)

(72) Inventors: Yusuke Ogata, Toyota (JP); Hirofumi Nakada, Toyota (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 319 days.

(21) Appl. No.: 14/778,269

(22) PCT Filed: Jun. 7, 2013

(86) PCT No.: PCT/JP2013/065841
§ 371 (c)(1),
(2) Date: Sep. 18, 2015

(87) PCT Pub. No.: WO2014/147854
PCT Pub. Date: Sep. 25, 2014

(65) Prior Publication Data
US 2016/0146338 A1 May 26, 2016

(30) Foreign Application Priority Data

Mar. 21, 2013 (JP) .................................. 2013-058291

(51) Int. Cl.
*F16H 61/02* (2006.01)
*F16D 48/02* (2006.01)
(Continued)

(52) U.S. Cl.
CPC ........... *F16H 61/0267* (2013.01); *B60K 6/48* (2013.01); *F16D 25/14* (2013.01);
(Continued)

(58) Field of Classification Search
CPC .. F16H 61/0031; F16H 61/0267; F16D 25/14; Y10T 137/86163; Y10T 137/86027;
(Continued)

(56) References Cited

U.S. PATENT DOCUMENTS 5,826,676 A * 10/1998 Ko ........................... B62D 5/30
180/403
6,390,947 B1 * 5/2002 Aoki ...................... B60W 10/06
477/156
(Continued)

FOREIGN PATENT DOCUMENTS

JP 3827926 9/2006
JP 2010-7781 1/2010
(Continued)

*Primary Examiner* — Atif Chaudry
(74) *Attorney, Agent, or Firm* — Finnegan, Henderson, Farabow, Garrett & Dunner, LLP

(57) ABSTRACT

A hydraulic control system for vehicles is provided. A switching valve (34) that is adapted to provide a communication between an electric oil pump (25) and a drain passage while inhibiting a delivery of the oil from the electric oil pump (25) to the control object (20, C) when an output pressure of the mechanical oil pump (9) is higher than a predetermined level, and to provide a communication between the electric oil pump (25) and the control object (20, C) through a predetermined oil passage when an output pressure of the mechanical oil pump (9) is lower than the predetermined level. The electric oil pump (25) discharges oil before establishing the communication between the electric oil pump (25) and the control object (20, C) as a result of reduction in the output pressure of the mechanical oil pump (9) to be lower than the predetermined level.

28 Claims, 7 Drawing Sheets

(51) Int. Cl.
*F16H 61/14* (2006.01)
*B60K 6/48* (2007.10)
*F16H 61/00* (2006.01)
*F16H 61/662* (2006.01)

(52) U.S. Cl.
CPC ..... *F16H 61/0021* (2013.01); *F16H 61/0031* (2013.01); *F16H 61/143* (2013.01); *F16H 61/0276* (2013.01); *F16H 61/66272* (2013.01); *Y10T 137/8601* (2015.04); *Y10T 137/86019* (2015.04); *Y10T 137/86027* (2015.04); *Y10T 137/86163* (2015.04)

(58) Field of Classification Search
CPC ...... Y10T 137/8601; Y10T 137/86019; B60K 6/48
See application file for complete search history.

(56) References Cited

U.S. PATENT DOCUMENTS

| | | | |
|---|---|---|---|
| 7,163,481 B2* | 1/2007 | Takagi | F16H 61/0031 192/3.57 |
| 8,403,646 B2* | 3/2013 | Yoshinami | F04C 2/102 417/2 |
| 2004/0192502 A1* | 9/2004 | Suzuki | F16H 61/0031 477/127 |
| 2009/0232673 A1* | 9/2009 | Reisch | F16H 57/0434 417/364 |
| 2010/0181159 A1* | 7/2010 | Shimizu | F16H 61/0031 192/85.63 |
| 2011/0034299 A1* | 2/2011 | Nakamura | F16H 61/0031 477/167 |
| 2011/0120568 A1* | 5/2011 | Borntraeger | F16H 61/0031 137/14 |
| 2012/0062157 A1* | 3/2012 | Ota | H02P 21/18 318/400.21 |
| 2012/0144818 A1* | 6/2012 | Shimizu | F04B 17/03 60/459 |

FOREIGN PATENT DOCUMENTS

| | | |
|---|---|---|
| JP | 2010-164178 | 7/2010 |
| JP | 2010-209991 | 9/2010 |
| JP | 2010-236693 | 10/2010 |
| JP | 2011-179564 | 9/2011 |

\* cited by examiner

HYDRAULIC CONTROL SYSTEM FOR VEHICLES

CROSS-REFERENCE TO RELATED APPLICATIONS

This application is a national phase application of International Application No. PCT/JP2013/065841, filed Jun. 7, 2013, and claims the priority of Japanese Application No. 2013-058291, filed Mar. 21, 2013, the content of both of which is incorporated herein by reference.

TECHNICAL FIELD

The present invention relates to a hydraulic control system for a vehicle having a mechanical oil pump that discharges oil by torque of a prime mover, and more particularly, to a hydraulic control system that is configured to stop the prime mover either during propulsion or temporary stopping of the vehicle.

BACKGROUND ART

In the conventional vehicles, a transmission for changing speed of the engine serving as a prime mover and an engagement device in which a torque transmitting capacity thereof is varied in accordance with an engagement pressure are controlled hydraulically. To this end, the vehicle of this kind is provided with a mechanical oil pump that is connected to a rotary member rotated together with an engine to be driven. In order to control the transmission and the engagement device hydraulically, a line pressure established by the oil discharged from the mechanical oil pump is regulated to a predetermined initial pressure. The surplus oil discharged to regulate the line pressure may be delivered to a torque converter or a lubrication site.

In the conventional art, a so-called "economy running system" or a "stop-start system" have been in practice to save fuel by stopping the engine when the engine power is required neither to rotate drive wheels nor to activate auxiliaries such as an alternator for generating electric power.

Given that the engine is stopped by such an automatic stopping system in the vehicle having the mechanical oil pump driven by the engine, pressurized oil will not be discharged from the mechanical oil pump during stopping the engine. In this situation, a speed change operation of the transmission and an engagement of the engagement device may not be carried out. In order to avoid such disadvantages, the conventional vehicle of this kind is further provided with an electric motor that is activated independently from the engine, and an electric oil pump that is driven by the output torque of the electric motor.

An example of the hydraulic control system for vehicles having the mechanical oil pump and the electric oil pump is disclosed in Japanese Patent Laid-Open No. 2010-209991. The control device taught by Japanese Patent Laid-Open No. 2010-209991 is configured to deliver oil to a hydraulic actuator for changing a speed ratio from the electric oil pump, and to prevent the oil discharged by the electric oil pump from flowing toward to a cooling site and a lubrication site during stopping the engine automatically. Specifically, the control device is configured to deliver the oil from the mechanical oil pump to the hydraulic actuator through a check valve and a control valve, and to deliver the oil from the electric oil pump to a passage connected to the control valve and the actuator through the check valve. Thus, in the hydraulic control device of this kind, the pressurized oil is delivered to the hydraulic actuator from the electric oil pump when the mechanical oil pump is inactivated during stopping the engine automatically. That is, the hydraulic pressure applied to the hydraulic actuator to carry out a speed change operation can be controlled even during stopping the engine automatically, by controlling the pressure of the oil discharged from the electric oil pump, or by draining the oil when the pressure in the hydraulic actuator is increased by controlling the control valve. In addition, since the electric oil pump is not required to deliver the oil to the cooling site and the lubrication site, the electric oil pump may be downsized.

However, according to the hydraulic control device taught by Japanese Patent Laid-Open No. 2010-209991, air may remain in the oil passage in an upstream side of the electric oil pump when the electric oil pump is started. Given that the electric oil is driven to apply the hydraulic pressure to the hydraulic actuator in this situation, controllability of the hydraulic actuator may be degraded. In addition, given that the control valve is opened to discharge air from the passage in the upstream side of the electric oil pump when starting the electric oil pump, the hydraulic pressure of the hydraulic actuator cannot be increased rapidly during discharging the air. That is, hydraulic response of the hydraulic actuator would be slowed.

DISCLOSURE OF THE INVENTION

The present invention has been conceived noting the foregoing technical problems, and it is therefore an object of the present invention is to provide a hydraulic control system for vehicles configured to prevent air intrusion into oil delivered to a control object during stopping a prime mover and delivering the oil to the control object from an electric oil pump.

The hydraulic control system according to the present invention comprises: a mechanical oil pump that is driven by a prime mover; an electric oil pump that is driven by an output torque of an electric motor; and a control object that is controlled by an oil delivered from at least one of the mechanical oil pump and the electric oil pump. In order to achieve the above-mentioned objective, according to the present invention, the hydraulic control system is provided with a switching valve that is adapted to provide a communication between the electric oil pump and a drain passage while inhibiting a delivery of the oil from the electric oil pump to the control object when an output pressure of the mechanical oil pump is higher than a predetermined level, and to provide a communication between the electric oil pump and the control object through a predetermined oil passage when an output pressure of the mechanical oil pump is lower than the predetermined level. In addition, the hydraulic control system is configured to discharge the oil from the electric oil pump before establishing the communication between the electric oil pump and the control object as a result of reduction in the output pressure of the mechanical oil pump to be lower than the predetermined level.

The predetermined oil passage includes a first oil passage for delivering the oil delivered to the control object partially to a low pressure site where a required pressure is lower than that of the control object. The switching valve is adapted to allow the oil discharged from the electric oil pump to flow toward the control object through the first oil passage while inhibiting a delivery of the oil to flow toward the low pressure site, when the output pressure of the mechanical oil pump falls below the predetermined level so that the communication between the electric oil pump and the control object through the first oil passage is established.

The hydraulic control system further comprises: a regulator valve that regulates hydraulic pressure applied to the control object, and an output side thereof is connected to the first regulator valve; a first orifice that reduces a flow rate of the oil flowing from the first oil passage to the low pressure site; and a second oil passage that is connected to the mechanical oil pump and the regulator valve, and that allows the oil to be delivered to the low pressure site when a speed of the prime mover exceeds a predetermined speed.

The hydraulic control system further comprises a control valve that controls hydraulic pressure applied to the control object based on an initial pressure established by the oil discharged from the mechanical oil pump. Specifically, the control valve is opened to lower the hydraulic pressure applied to the control object when the hydraulic pressure applied to the control object is higher than the required pressure thereof during delivering the oil from the electric oil pump to the control object.

The hydraulic control system further comprises a first check valve that is disposed on an oil passage connecting the mechanical oil pump to the control valve to prevent back flow of the oil toward the mechanical oil pump. In addition, the switching valve is adapted to establish a communication between an oil passage of an input side of the first check valve and an oil passage of an output side of the first check valve when the output pressure of the mechanical oil pump is higher than the predetermined level.

The switching valve comprises: an input port connected to the electric oil pump; a drain port that drains the oil discharged from the electric oil pump when the output pressure of the mechanical oil pump is lower than the predetermined level; and an output port connected to an oil passage of an input side of the control valve. The control valve includes a first linear solenoid valve adapted to change an output pressure thereof in accordance with an electric current applied thereto. The hydraulic control system further comprises a correction means configured to increase a current value applied to the first linear solenoid valve to control the hydraulic pressure applied to the control object when the hydraulic pressure applied thereto is low, to be larger than a current value applied to the first linear solenoid valve to control the hydraulic pressure applied to the control object when the hydraulic pressure applied thereto is high.

Specifically, the correction means is configured to increase a current value applied to the first linear solenoid valve to control the hydraulic pressure applied to the control object when the output pressure of the mechanical oil pump is lower than the predetermined level and therefore the electric oil pump delivers the oil to the control object, to be larger than the current value applied to the first linear solenoid valve to control the hydraulic pressure applied to the control object when the output pressure of the mechanical oil pump is higher than the predetermined level and therefore the mechanical oil pump delivers the oil to the control object.

The hydraulic control system further comprises a second orifice that reduces a flow rate of the oil discharged from the electric oil pump being drained through the drain passage, when the output pressure of the mechanical oil pump is higher than the predetermined level.

The predetermined level may be higher than a maximum required pressure of the control object.

The predetermined level may be lower than a maximum pressure level to be established by the electric oil pump.

The control object includes an engagement device that is brought into engagement when starting the vehicle.

The hydraulic control system further comprises a second check valve that is disposed on an oil passage connecting the electric oil pump to the switching valve to prevent back flow of the oil toward the electric oil pump.

The control object includes a hydraulic actuator adapted to change a speed ratio of a transmission in accordance with hydraulic pressure applied thereto, and to reduce the speed ratio by discharging the oil therefrom.

The hydraulic control system further comprises: a fluid coupling that transmits a torque hydraulically from the prime mover; and a lockup clutch that is arranged in parallel to the fluid coupling to directly transmit the torque from the prime mover when brought into engagement. In addition, the control object includes a second linear solenoid valve adapted to control an engagement pressure of the lockup clutch in accordance with an electric current applied thereto.

The switching valve is actuated in accordance with an applied signal pressure established by the mechanical oil pump.

The switching valve is actuated in accordance with an applied signal pressure established by the electric oil pump.

The switching valve includes a spool valve adapted to switch a connection among the oil passages depending on a balance between a load pushing a spool thereof based on the signal pressure and an elastic force counteracting said load.

The hydraulic control system is further configured to control an output pressure of the electric oil pump in accordance with a required pressure of the control object when the output pressure of the mechanical oil pump is lower than the predetermined level.

Thus, the hydraulic control system is provided with a switching valve that is adapted to provide a communication between the electric oil pump driven by a torque of the motor and a drain passage while inhibiting a delivery of the oil from the electric oil pump to the control object when an output pressure of the mechanical oil pump driven by the prime mover is higher than a predetermined level, and to provide a communication between the electric oil pump and the control object through a predetermined oil passage when an output pressure of the mechanical oil pump is lower than the predetermined level. In addition, the hydraulic control system is configured to discharge the oil from the electric oil pump before establishing the communication between the electric oil pump and the control object as a result of reduction in the output pressure of the mechanical oil pump to be lower than the predetermined level. Therefore, the air remaining in the oil passage of output side of the electric oil pump can be discharged together with the oil discharged from the electric oil pump before a communication between the electric oil pump and the control object through the predetermined oil passage is established. For this reason, air intrusion in the oil delivered from the electric oil pump to the control object can be solved. Consequently, deterioration in controllability or hydraulic response of the control object can be prevented during delivering the oil from the electric oil pump to the control object.

As described, the hydraulic control system is further provided with the first oil passage for delivering the oil delivered to the control object partially to the low pressure site where a required pressure is lower than that of the control object. In addition, the switching valve is adapted to allow the oil discharged from the electric oil pump to flow toward the control object through the first oil passage while inhibiting a delivery of the oil to flow toward the low pressure site, when the output pressure of the mechanical oil pump falls below the predetermined level so that the communication between the electric oil pump and the control object through the first oil passage is established. For these reasons, a smaller electric oil pump having smaller capacity may be used. In addition, the oil can be delivered from the electric oil pump to the control object through the first oil passage. That is, the first oil passage may be used to deliver the oil from the electric oil pump to the control object during cessation of the electric oil pump so that the hydraulic control system can be prevented from being increased in its size.

As also described, the hydraulic control system further comprises: the regulator valve that regulates hydraulic pressure applied to the control object, and an output side thereof is connected to the first regulator valve; the first orifice that reduces a flow rate of the oil flowing from the first oil passage to the low pressure site; and the second oil passage that is connected to the mechanical oil pump and the regulator valve, and that allows the oil to be delivered to the low pressure site when a speed of the prime mover exceeds a predetermined speed. Therefore, the oil can be delivered to the low pressure site not only through the first oil passage but also through the second oil passage when a speed of the prime mover exceeds a predetermined value.

As also described, the hydraulic control system is further comprises the control valve that controls hydraulic pressure applied to the control object based on an initial pressure established by the oil discharged from the mechanical oil pump. In addition, the control valve may be opened to lower the hydraulic pressure applied to the control object when the hydraulic pressure applied to the control object is higher than the required pressure thereof during delivering the oil from the electric oil pump to the control object. That is, the control valve may be uses as a so-called relief valve. Therefore, it is unnecessary to arrange an additional relief valve for the case of delivering the oil from the electric oil pump to the control object so that the hydraulic control system can be prevented from being increased in its size.

As also described, the hydraulic control system further comprises the first check valve that is disposed on an oil passage connecting the mechanical oil pump to the control valve to prevent back flow of the oil toward the mechanical oil pump. In addition, the switching valve may be adapted to establish a communication between the oil passage of an input side of the first check valve and the oil passage of an output side of the first check valve when the output pressure of the mechanical oil pump is higher than the predetermined level. Therefore, the oil still can be delivered from the mechanical oil pump to the control object through the first switching valve even if the first check valve cannot be opened due to failure. In addition, it is also possible to deliver the oil from the mechanical oil pump to the control object through the first switching valve even if the connection between the electric oil pump and the control object cannot be established due to failure.

In addition, the oil delivered from the electric oil pump may also be delivered to the input side of the first linear solenoid valve adapted to change an output pressure thereof in accordance with an electric current applied thereto. In this case, a current value applied to the first linear solenoid valve may be corrected in accordance with hydraulic pressure applied to the first linear solenoid valve to prevent fluctuation in the output pressure of the first linear solenoid valve.

Specifically, the current value applied to the first linear solenoid valve to control the hydraulic pressure applied to the control object is increased when the output pressure of the mechanical oil pump is lower than the predetermined level and therefore the electric oil pump delivers the oil to the control object, to be larger than the current value applied to the first linear solenoid valve to control the hydraulic pressure applied to the control object when the output pressure of the mechanical oil pump is higher than the predetermined level and therefore the mechanical oil pump delivers the oil to the control object. Therefore, shortage of the oil delivered to the control object resulting from reduction in the output pressure of the first linear solenoid valve can be prevented when delivering the oil from the electric oil pump to the control object.

As also described, the hydraulic control system further comprises the second orifice that reduces a flow rate of the oil discharged from the electric oil pump being drained through the drain passage, when the output pressure of the mechanical oil pump is higher than the predetermined level. Therefore, an output pressure of the electric oil pump can be increased. For this reason, shortage of the oil delivered to the control object can be prevented even when a communication between the electric oil pump and the control object is established.

Since the predetermined level is set to be higher than the maximum required pressure of the control object, shortage of the oil delivered to the control object before switching the switching valve can be prevented.

Since the predetermined level may also be set to be lower than the maximum pressure level to be established by the electric oil pump, backflow of the oil from the control object toward the electric oil pump can be prevented when the switching valve is switched in such a manner to establish a communication between the electric oil pump and the control object. Therefore, reduction in the hydraulic pressure in the control object resulting from switching the switching valve can be prevented. In addition, it is also possible to prevent backflow of highly pressurized oil toward the electric oil pump.

As also described, the control object includes the engagement device that is brought into engagement when starting the vehicle, and the oil may be delivered from the electric oil pump to the engagement device before starting or reaccelerating the vehicle. Accordingly, a required time until an engagement of the engagement device before starting or reaccelerating the vehicle can be shortened so that a response delay can be suppressed.

In the hydraulic control system, the oil may be delivered from the electric oil pump to the engagement device, and the second check valve for inhibiting backflow of the oil toward the electric oil pump may be disposed on the oil passage connected to the electric oil pump and the switching valve. In this case, an oil leakage from the electric oil pump resulting from backflow of the oil from the engagement device toward the electric oil pump can be prevented under conditions that the output pressure of the mechanical oil pump drops and that the electric oil pump is stopped.

In addition, the oil may be delivered from the electric oil pump to the second linear solenoid valve for controlling the engagement pressure of the lockup clutch disposed in parallel to the fluid coupling. The lockup clutch may be brought into engagement by the oil discharged from the electric oil pump when towing the vehicle, so that the mechanical oil pump can be activated by the torque transmitted from the drive wheels. After starting towing of the vehicle, the oil can be delivered to the low pressure site by the mechanical oil pump.

DETAILED DESCRIPTION OF THE PREFERRED EMBODIMENT(S)

Figure 2:
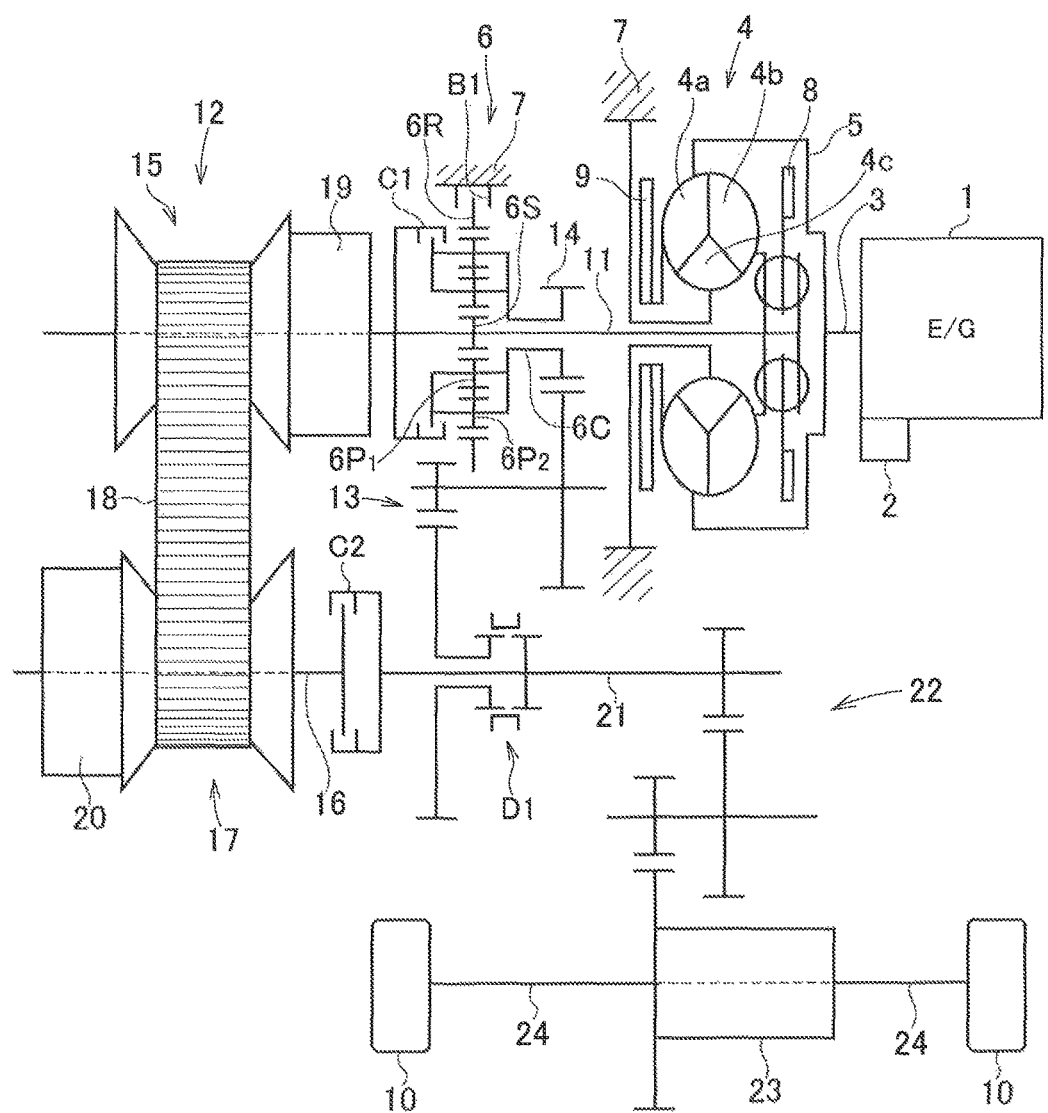
FIG. 2 is a schematic illustration showing one example of a powertrain of the vehicle to which the present invention is applied.

A vehicle to which the present invention is applied comprises a mechanical oil pump that is driven by a torque of a prime mover to discharge oil to establish an initial pressure to control a control object. Referring now to FIG. 2, there is schematically shown one example of a powertrain having the mechanical oil pump and the control object. The power transmission unit shown in FIG. 2 has an engine 1 serving as a prime mover. The engine 1 is adapted to generate power by combusting fuel delivered thereto, and for example, a gasoline engine, a diesel engine, or a liquefied petroleum gas engine may be used as the engine 1. The engine 1 is connected to a starter motor 2 for cranking the engine 1. In the example shown in FIG. 2, the engine 1 is employed as the prime mover of the vehicle, however, but the hydraulic control system of the present invention may also be applied to an electric vehicle powered by an electric motor, or a hybrid vehicle powered by both engine and motor.

A torque converter 4 as a fluid coupling is connected to an output shaft 3 of the engine 1. A conventional fluid coupling may be used as the torque converter 4, and the torque converter 4 is comprised of: a pump impeller 4a that is connected to the engine 1 through the output shaft 3 and a front cover 5; a turbine runner 4b that is disposed to be opposed to the pump impeller 4a while being connected to a torque reversing device 6; and a stator 4c that is disposed between the pump impeller 4a and the turbine runner 4b while being connected to a casing 7 through a not shown one-way clutch. A working fluid is encapsulated in a space enclosed by the pump impeller 4a and the turbine runner 4b. In the torque converter 4 thus structured, the pump impeller 4a is rotated by a torque transmitted from the engine 1 to create a spiral flow of the fluid so that the turbine runner 4b is rotated. The stator 4c is provided to restrict a direction of the flowing working fluid, and the stator 4c is fixed to the casing 7 through a one way clutch in such a manner not to be rotated when a rotational speed of the turbine runner 4b is higher than that of the pump impeller 4a. Thus, the torque of the engine 1 can be multiplied within a so-called "converter region" to be transmitted to the torque reversing device 6. Accordingly, the torque converter 4 serves as a claimed fluid coupling.

In order to transmit engine power directly to an output shaft 11 under condition that the pump impeller 4a is rotated at a same speed as the turbine runner 4b, a lockup clutch 8 is interposed between the engine 1 and the torque converter 4. The lockup clutch 8 is a disk shaped friction engaging member, and actuated by a pressure difference between both sides. Specifically, the pump impeller 4a and the turbine runner 4b are rotated together by bringing the lockup clutch 8 into engagement with the front cover 5. In the example shown in FIG. 2, the lockup clutch 8 is moved toward the engine 1 by reducing the hydraulic pressure in the engine 1 side (i.e., the right side in FIG. 2) to be lower than that in the torque converter 4 side (i.e., the left side in FIG. 2). In this case, the lockup clutch 8 is frictionally brought into engagement with the front cover 5 so that the pump impeller 4a and the turbine runner 4b are rotated integrally. By contrast, the lockup clutch 8 is disengaged from the front cover 5 by increasing the hydraulic pressure in the engine 1 side to be higher than that in the torque converter 4 side so that the torque is transmitted through the working fluid.

In the example shown in FIG. 2, a mechanical oil pump 9 that is driven by the torque of the engine 1 to discharge the oil is connected to the pump impeller 4a. Specifically, the mechanical oil pump 9 is driven by the torque of the engine 1 transmitted thereto through the output shaft 3 and the front cover 5 and the pump impeller 4a. The mechanical oil pump 9 is also driven by a running inertial force of the vehicle even when the engine 1 does not generate torque for rotating drive wheels 10, e.g., when an engine braking force is applied to the drive wheels 10. In addition, a not shown alternator is also connected to the output shaft 3 of the engine 1, and a not shown battery is charged with electric power generated by rotating the output shaft 3.

In order to transmit the torque to the drive wheels 10 without passing through the belt-driven continuously variable transmission 12, the output shaft 11 integrated with the turbine runner 4 is connected to the torque reversing device 6 for reversing a direction of the torque transmitted to the drive wheels 10. In the example shown in FIG. 2, a double-pinion planetary gear unit is employed as the torque reversing device 6. Specifically, the torque reversing device 6 is comprised of: a sun gear 6S integrated with the output shaft 11; a ring gear 6R arranged concentrically with the sun gear 6S; first pinion gears $6P_1$ individually meshing with the sun gear 6S; second pinion gears $6P_2$ individually meshing with the first pinion gears $6P_1$ and the ring gear 6R; and a carrier 6C connected to a gear train 13 through an output gear 14 while supporting the first pinion gears $6P_1$ and the second pinion gears $6P_2$ in a rotatable and revolvable manner. In addition, a clutch C1 is also disposed on the output shaft 11 to rotate the sun gear 6S and the carrier 6C integrally by bringing the clutch C1 into engagement, and a brake B1 is arranged on the casing 7 to stop rotation of the ring gear 6R.

In the torque reversing device 6, the sun gear 6S serves as an input element, the ring gear 6R serves as an reaction element, and the carrier 6C serves as an output element. Therefore, the output shaft 11 and the output gear 14 are rotated integrally by bringing the clutch C1 into engagement while bringing the brake B1 into disengagement to integrate the sun gear 6S with the carrier 6C. By contrast, the sun gear 6S and the carrier 6C are rotated in opposite directions by bringing the clutch C1 into disengagement while bringing the brake B1 into engagement so that the output shaft 11 and the output gear 14 are rotated in opposite directions. Specially, both the clutch C1 and the brake B1 are frictional engaging devices hydraulically actuated, and the clutch C1 and the brake B1 are brought into engagement by a shifting operation of a not shown shift lever. A gear ratio to transmit the torque to the drive wheels 10 through the torque reversing device 6 and the gear train 13 is set to be larger than a maximum speed ratio of a belt-driven continuously variable transmission 12 to transmit the torque to the drive wheels 10. When starting the stopping vehicle, the torque is transmitted to the drive wheels 10 through the torque reversing device 6 and the gear train 13 in most cases.

The belt-driven continuously variable transmission 12 (to be abbreviated as the "CVT" 12 hereinafter) is also connected to the output shaft 11. The CVT 12 shown in FIG. 2 comprises a primary pulley 15 fitted onto the output shaft 11, an output shaft 16 arranged parallel to the output shaft 11, a secondary pulley 17 fitted onto the output shaft 11, and a belt 18 running between those pulleys 15 and 17. Each pulley 15 and 17 is provided individually with an hydraulic actuator 19 and 20, and a speed ratio thereof is varied by altering running radii of the belt 18 in the based on a difference between hydraulic pressures applied to the hydraulic actuator 19 and 20. A torque transmitting capacity of the CVT 12 is controlled by controlling the hydraulic pressure applied to the hydraulic actuator 20 attached to the secondary pulley 17 to control a clamping pressure for holding the belt 18. Specifically, when the oil is discharged from the hydraulic actuator 20 of the secondary pulley 17 to reduce the hydraulic pressure therein, the speed ratio of the CVT 12 is reduced. Here, the CVT 12 serves as the claimed transmission, and the hydraulic actuator 20 corresponds to the claimed control object.

A clutch C2 is disposed on the output shaft 16 of the CVT 12, and the torque is transmitted to the output shaft 21 through the clutch C2. The clutch C2 is adapted to be brought into engagement so as to enable torque transmission between the CVT 12 and the drive wheels 10, and the torque transmitting capacity of the clutch C2 is controlled in accordance with the hydraulic pressure applied thereto.

On the output shaft 21, a dog clutch D1 is disposed to enable the torque transmission between the torque reversing device 6 and the drive wheels 10 when brought into engagement. Specifically, the dog clutch D1 is adapted to connect the gear train 13 and the output shaft 21 to transmit the torque therebetween. For example, the dog clutch D1 is brought into engagement to connect the gear train 13 to the output shaft 21 when starting the stopping vehicle. Engagement and disengagement of the dog clutch D1 is controlled by a not shown hydraulic actuator or electric actuator. The output shaft 21 is connected to the drive wheels 10 through a gear train 22, a differential gear 23 and a drive shaft 24.

As described, in the vehicle having the power transmission unit thus structured, a stop-start control (to be simply called as "S&S" control) is executed to automatically stop the engine 1 during propulsion or brief stop of the vehicle. Under the S&S control, the engine 1 is automatically stopped upon satisfaction of a predetermined condition to save the fuel for operating the engine 1. For example, the engine 1 is stopped by the S&S control when the torque of the engine 1 is not required to rotate the drive wheels 10 during propulsion of the vehicle, or to drive auxiliaries during the brief stop. When restarting the stopped engine 1, a cranking of the engine 1 can be carried out by a running inertial force of the vehicle or by the starter motor 3. In case of stopping the engine 1, the torque transmission between the engine 1 and drive wheels 10 is interrupted to reduce a power loss resulting from rotating the engine 1 passively. In the example shown in FIG. 2, specifically, the clutch C2 is brought into disengagement to interrupt the torque transmission between the CVT 12 and the drive wheels 12, and at least one of the dog clutch D1, the clutch C1 and the brake B1 is brought into disengagement to interrupt the torque transmission to the drive wheels 10 through the torque reversing device 6 and the gear train 13.

In case of stopping the engine 1 in the stopping vehicle, it is preferable to bring the clutch C1 into engagement to avoid response delay to accelerate the vehicle on a subsequent restarting of the vehicle. By contrast, in case of stopping the engine 1 during propulsion of the vehicle, it is preferable to adjust a speed ratio and a torque transmitting capacity of the CVT 12 in accordance with a vehicle speed to suppress an expected engagement shock of the clutch C2 and to avoid fluctuation of the driving force, when enabling a torque transmission between the engine 1 to the drive wheels 10 again. To this end, the hydraulic control system of the present invention is provided with an electric oil pump 25 which can discharge the oil to control the speed ratio and the torque transmitting capacity of the CVT 12, and actuation of the clutch C1 and the brake B1, even when the engine 1 is automatically stopped by the S&S control and hence the mechanical oil pump 9 does not discharge the oil.

Figure 1:
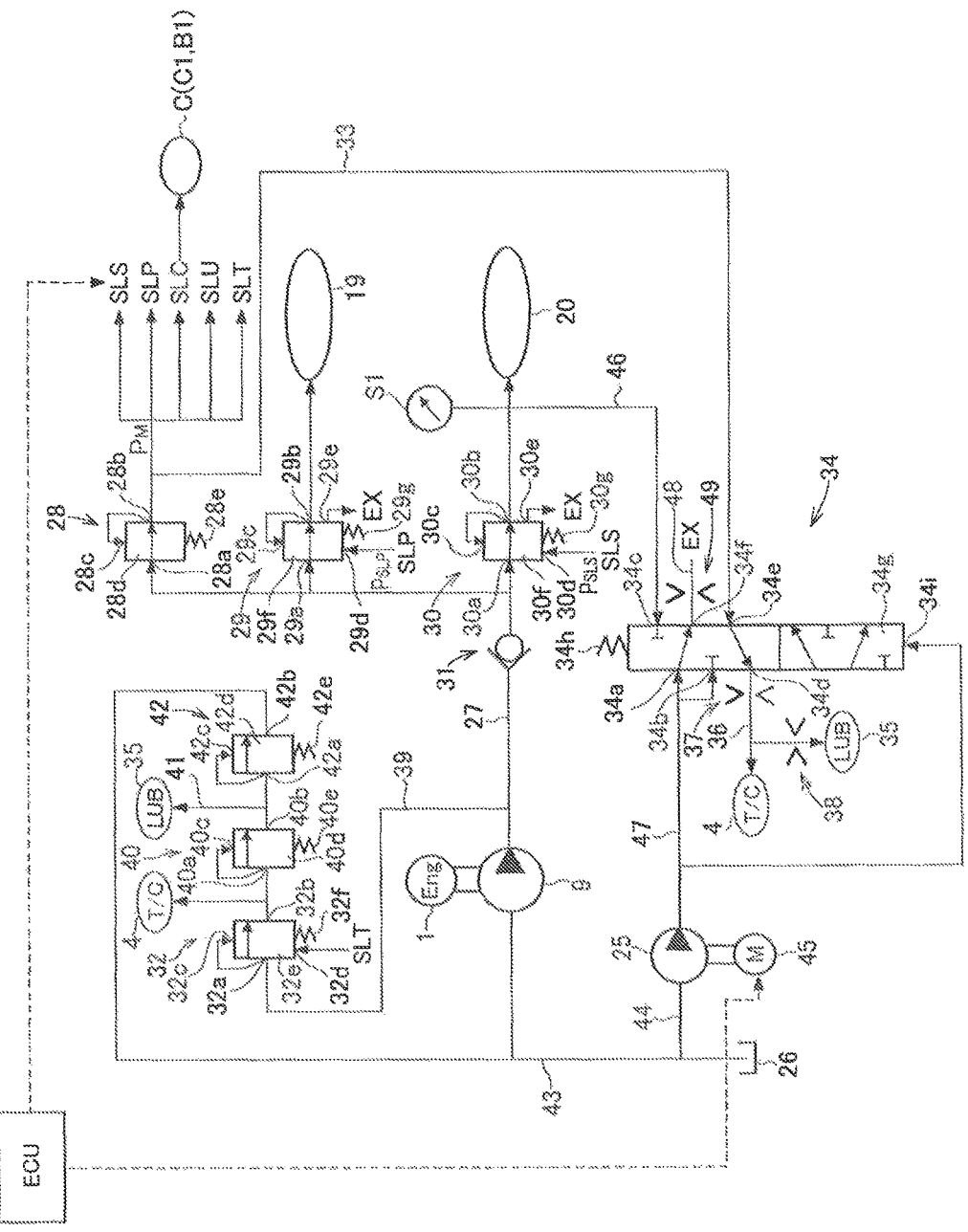
FIG. 1 is a hydraulic circuit diagram showing one example of a hydraulic control system for vehicles to which the present invention is applied.

Turning to FIG. 1, there is shown a hydraulic circuit diagram showing one example of the hydraulic control system having the electric oil pump 25. The mechanical oil pump 9 driven by the running inertial force of the vehicle and the output torque of the engine 1 is connected to the pump impeller 4a, and the mechanical oil pump 9 is adapted to pump up the oil from the oil pan 26. The mechanical oil pump 9 is disposed on an oil passage 27 to discharge the oil to the oil passage 27. On the oil passage 27, there are arranged a modulator valve 28 for regulating oil pressure to a constant level, a first control valve 29 for controlling pressure or amount of the oil delivered to the hydraulic actuator 19 of the primary pulley 15, and a second control valve 30 for controlling pressure or amount of the oil delivered to the hydraulic actuator 20 of the secondary pulley 17. A check valve 31 is disposed between the mechanical oil pump 9 and the first control valve 29, the second control valve 30 and the mechanical oil pump 9. The check valve 31 is adapted to allow the oil to flow only in a direction from the mechanical oil pump 9 toward the modulator valve 28, the first control valve 29 and the second control valve 30, and to prevent back flow of the oil discharged from the modulator valve 28, the first control valve 29 and the second control valve 30 toward the mechanical oil pump 9. The first check valve 31 serves as the claimed first check valve.

As shown in FIG. 1, the modulator valve 28 as a spool valve comprises an input port 28a connected to the oil passage 27, an output port 28b and a feedback port 28c to which output pressure is applied. In the modulator valve 28, an elastic force of a spring 28e is applied to one side of a spool 28d, and a load established by the output pressure from the feedback port 28c is applied to the other side of the spool 28d. That is, the spool 28d is balanced between the elastic force of the spring 28e and the output pressure applied from the feedback port 28c. When the output pressure applied from the feedback port 28c exceeds the elastic force of the spring 28e, the spool 28d is moved in a direction to interrupt a connection between the input port 28a and output port 28b. By contrast, when the output pressure applied from the feedback port 28c falls below the elastic force of the spring 28e, the spool 28d is moved in a direction to provide a connection between the input port 28a and output port 28b.

The oil discharged from the modulator valve 28 is delivered to a linear solenoid valve SLS adapted to apply a signal pressure to the second control valve 30, a linear solenoid valve SLP adapted to apply a signal pressure to the first control valve 29, a linear solenoid valve SLC adapted to deliver a hydraulic pressure to the clutch C1 and the brake B1, a linear solenoid valve SLU adapted to apply a signal pressure to a not shown control valve for controlling the lockup clutch 8, and a linear solenoid valve SLT adapted to apply a signal pressure to a first regulator valve 32. Each output pressure of the linear solenoid valves SLS, SLP, SLC, SLU and SLT is controlled based on a modulator pressure $P_M$ as an initial pressure delivered from the modulator valve 28. In addition, a not shown manual valve is disposed on an output side of the linear solenoid valve SLC, and an output pressure of the linear solenoid valve SLC is applied to either one of the clutch C1 and the brake B1 in accordance with an operation of a shift lever by the driver. In the following description, both the clutch C1 and the brake B1 will also be referred to as the "engagement device C". As described, the engagement device C is hydraulically is bought into engagement to start the stopping vehicle. Accordingly, the clutch C corresponds to the claimed control object, the modulator valve 28 serves as the claimed regulator valve, and the linear solenoid valve SLU serves as the second linear solenoid valve.

The oil discharged from the modulator valve 28 is partially delivered to the torque converter (T/C) 4 and a lubrication site (LUB) 35 through a switching valve 34 disposed on an oil passage 33. The lubrication site 35 includes meshing teeth of the gears and a contact site between each pulley 15, 17, and the belt 18, and the oil discharged from the modulator valve 28 is partially delivered thereto to reduce a friction loss at those sites. Unlike the hydraulic pressure applied to the engagement device C and hydraulic actuators 19 and 20, the oil delivered to the torque converter 4 and the lubrication sites 35 are not necessarily to be controlled. In addition, pressure of the oil delivered to the torque converter 4 or the lubrication sites 35 is lower than the pressure required by the engagement device C and hydraulic actuators 19 and 20. Accordingly, the torque converter 4 and the lubrication sites 35 correspond to the claimed low pressure sites, and the oil passage 33 corresponds to the claimed the first oil passage.

As shown in FIG. 1, an orifice 37 is arranged on an oil passage 36 connecting the switching valve 34, the torque converter 4 and the lubrication sites 35. The orifice 37 is adapted to prevent the oil from being discharged excessively from the oil passage 33 to the torque converter 4 and the lubrication site 35 so as to prevent a reduction in the modulator pressure $P_M$. An opening diameter of the orifice 37 is determined in such a manner to ensure a required amount of the oil delivered to the torque converter 4 and the lubrication sites 35 even if the engine 1 is rotated at a low speed and hence a discharging amount of the mechanical oil pump 9 is relatively small, more particularly, even if the engine 1 is rotated at a lowest self-sustaining speed such as an idling speed. In addition, an orifice 38 is arranged between the orifice 37 and the lubrication sites 35 to reduce an amount of the oil delivered to the lubrication site 35 to be smaller than that delivered to the torque converter 4. Here, the orifice 37 serves as the claimed first orifice.

The first control valve 29 comprises an input port 29a connected to the oil passage 27, an output port 29b connected to the hydraulic actuator 19, a feedback port 29c to which output pressure of the first control valve 29 is applied, a signal pressure port 29d connected to the linear solenoid valve SLP and a drain port 29e connected to the oil pan 26. The first control valve 29 is also a spool valve adapted to control hydraulic pressure in the hydraulic actuator 19 of the primary pulley 15. In the first control valve 29, an elastic force of a spring 29g and a load established by a signal pressure $P_{SLP}$ applied from the linear solenoid valve SLP are applied to one side of a spool 29f, and a feedback pressure from the hydraulic actuator 19, i.e., a load established by the output pressure of the first control valve 29 is applied to the other side of the spool 29f in a direction to counteract to the elastic force of the spring 29g and a load established by the signal pressure $P_{SLP}$.

That is, the spool 29f is balanced between the loads applied thereto, and accordingly, the hydraulic pressure applied to the hydraulic actuator 19 is governed by the signal pressure $P_{SLP}$ applied to the first control valve 29. Specifically, when the internal pressure of the hydraulic actuator 19 is relatively low and hence a load counteracting the load established by the signal pressure $P_{SLP}$ applied to the first control valve 29 is small, the spool 29f is moved in a direction to provide a connection between the input port 29a and the output port 29b so that the oil discharged from the mechanical oil pump 9 is delivered to the hydraulic actuator 19 to increase the internal pressure thereof. By contrast, when the internal pressure of the hydraulic actuator 19 is relatively high and hence the load counteracting the load established by the signal pressure $P_{SLP}$ applied to the first control valve 29 is large, the spool 29f is moved in a direction to provide a connection between the output port 29d and the drain port 29e so that the oil is drained from the hydraulic actuator 19 to the oil pan 26 to lower the internal pressure thereof.

A structure of the second control valve 30 adapted to control hydraulic pressure in the hydraulic actuator 20 of the secondary pulley 17 is similar to that of the first control valve 29. The second control valve 30 comprises an input port 30a connected to the oil passage 27, an output port 30b connected to the hydraulic actuator 20, a feedback port 30c to which output pressure of the second control valve 30 is applied, a signal pressure port 30d connected to the linear solenoid valve SLS, and a drain port 30e connected to the oil pan 26. In the second control valve 30, an elastic force of a spring 30g and a load established by a signal pressure $P_{SLS}$ applied from the linear solenoid valve SLS are applied to one side of a spool 30f, and a feedback pressure from the hydraulic actuator 20, i.e., a load established by the output pressure of the second control valve 30 is applied to the other side of the spool 30f in a direction to counteract to the elastic force of the spring 30g and a load established by the signal pressure $P_{SLS}$.

That is, the spool 30f is balanced between the loads applied thereto, and accordingly, the hydraulic pressure applied to the hydraulic actuator 20 is governed by the signal pressure $P_{SLS}$ applied to the second control valve 30. Specifically, when the internal pressure of the hydraulic actuator 20 is relatively low and hence a load counteracting the load established by the signal pressure $P_{SLS}$ applied to the second control valve 30 is small, the spool 30f is moved in a direction to provide a connection between the input port 30a and the output port 30b so that the oil discharged from the mechanical oil pump 9 is delivered to the hydraulic actuator 20 to increase the internal pressure thereof. By contrast, when the internal pressure of the hydraulic actuator 20 is relatively high and hence the load counteracting the load established by the signal pressure $P_{SLS}$ applied to the second control valve 30 is large, the spool 30f is moved in a direction to provide a connection between the output port 30d and the drain port 30e so that the oil is drained from the hydraulic actuator 20 to the oil pan 26 to lower the internal pressure thereof.

Basically, a control pressure of the hydraulic actuator 20 is maintained to be higher than the modulator pressure $P_M$ during propulsion of the vehicle. In order to detect a maximum hydraulic pressure in the hydraulic actuator 20 when delivering the oil thereto from the electric oil pump 25, in the example shown in FIG. 1, a hydraulic pressure sensor S1 is disposed on a discharging side of the second control valve 30.

As mentioned above, the output pressures of the modulator valve 28, the first control valve 29 and the second control valve 30 are controlled based on the hydraulic pressure in the oil passage 27 as an initial pressure. In order to regulate the hydraulic pressure in the oil passage 27, the first regulator valve 32 is disposed on an oil passage 39 branching from the oil passage 27. The first regulator valve 32 as a spool valve comprises an input port 32a connected to the oil passage 39, an output port 32b, a feedback port 32c to which hydraulic pressure of the oil passage 39 is applied, and a signal pressure port 32d to which output pressure of $P_{SLT}$ of the linear solenoid valve SLT is applied. In the first regulator valve 32, an elastic force of a spring 32f and a load established by the a signal pressure $P_{SLT}$ applied from the linear solenoid valve SLT is applied to one side of a spool 32e, and a load established by the hydraulic pressure in the oil passage 39 is applied to the other side of the spool 32e in a direction to counteract to the elastic force of the spring 32f and a load established by the signal pressure $P_{SLT}$. That is, the spool 32e is balanced between the loads applied thereto. The oil passage 39 serves as the second oil passage.

The signal pressure $P_{SLT}$ applied to the first regulator valve 32 is changed by a required driving force based on an opening degree of accelerator. That is, hydraulic pressure in the oil passage 39 is increased with an increment of the required driving force. For example, when the hydraulic pressure in the oil passage 39 is higher than the hydraulic pressure achieved based on the required driving force, the first regulator valve 32 is opened to discharge the oil from the oil passage 39. To the contrary, when the hydraulic pressure in the oil passage 39 is lower than the hydraulic pressure achieved based on the required driving force, the first regulator valve 32 is closed so that the hydraulic pressure of the oil passage 39 is increased. To this end, the first regulator valve 32 is adapted to be opened upon exceedance of the predetermined engine speed.

The oil discharged from the first regulator valve 32 is delivered to the torque converter 4. A second regulator valve 40 which is opened when the hydraulic pressure of the torque converter 4 exceeds a predetermined level is disposed on a discharging side of the first regulator valve 32. Specifically, the second regulator valve 40 comprises an input port 40a connected to the torque converter 4 and to the output port 32b of the first regulator valve 32, an output port 40b, and an feedback port 40c to which the hydraulic pressure of the torque converter 4 is applied. Specifically, a spool type relief valve is used as the second regulator valve 40. In the second regulator valve 40, an elastic force of a spring 40e is applied to one side of a spool 40d, and a load established by the output pressure from the torque converter 4 is applied to the other side of the spool 40d. That is, the spool 40d is balanced between the loads applied thereto. When a load established by the hydraulic pressure of the torque converter 4 exceeds the elastic force of the spring 40e, a connection between the input port 40a and output port 40b is provided. By contrast, when a load established by the hydraulic pressure of the torque converter 4 falls below the elastic force of the spring 40e, the connection between the input port 40a and output port 40b is interrupted so that the hydraulic pressure of the torque converter 4 is increased. That is, the hydraulic pressure of the torque converter 4 is governed by the elastic force of the spring 40e.

An discharging side of the second regulator valve 40 is connected to an oil passage 41 for delivering the oil to the lubrication site 35, and a third regulator valve 42 adapted to discharge the oil to the oil pan 26 when the hydraulic pressure of the oil passage 41 exceeds a predetermined pressure is disposed on the discharging side of the second regulator valve 40. The third regulator valve 42 is also the spool type relief valve that is adapted to be opened when the hydraulic pressure of the oil passage 41 for delivering the oil to the lubrication site 35 is increased excessively e.g., when the oil passage 41 is clogged. The third regulator valve 42 comprises an input port 42a connected to the lubrication site 35 and to the output port 40b of the second regulator valve 40, an output port 42b connected to the oil pan 26, and a feedback port 42c to which the hydraulic pressure of the lubrication site 35 is applied. In the third regulator valve 42, an elastic force of a spring 42e is applied to one side of a spool 42d, and a load established by the hydraulic pressure of the oil passage 41 is applied to the other side of the spool 42d. That is, the spool 40d is balanced between the loads applied thereto, and the third regulator valve 42 is opened and closed depending on a moving direction of the spool 42d. Specifically, when the load established by the hydraulic pressure in the oil passage 41 exceeds the elastic force of the spring 42e, a connection between the input port 42a and the output port 42b is provided to discharge the oil.

In the hydraulic control system thus structured, when the engine 1 is driven and hence the oil is discharged from the mechanical oil pump 9, hydraulic pressure based on the line pressure as the initial pressure regulated by the first regulator valve 32 is applied to each hydraulic actuator 19 and 20 of the CVT 12 and torque reversing device 6 of the engagement device C. In this situation, the oil discharged from the modulator valve 28 is constantly delivered to the torque converter 4 and the lubrication site 35. In addition, when the hydraulic pressure in the oil passage 27 (39) is increased with an increment of the engine speed, the first regulator valve 32 is opened to deliver the oil to the torque converter 4 and the lubrication site 35.

In order to deliver the oil to the engagement device C and to the hydraulic actuators 19 and 20 when the engine 1 is stopped by the S&S control, the hydraulic control system shown in FIG. 1 is provided with the electric oil pump 25. The electric oil pump 25 has a capacity smaller than that of the mechanical oil pump 9 but it is sufficient to deliver the oil to the hydraulic actuators 19 and 20 and the engagement device C in an amount to achieve the maximum hydraulic pressure required by those elements during execution of the S&S control. In the example shown in FIG. 1, the electric oil pump 25 is disposed on an oil passage 44 branching from an oil passage 43 connected to the oil pan 26 and the electric oil pump 25. The electric oil pump 25 is activated by an output torque of a motor 45 driven by electric power from a not shown battery.

The switching valve 34 is disposed to switch a supply destination of the oil discharged from the electric oil pump 25 among the hydraulic actuator 19 and 20 and the linear solenoid valves SLS, SLP, SLC, SLU and SLT. The switching valve 34 shown in FIG. 1 is a spool valve adapted to switch a position of a spool between: a position in which the oil discharged from the modulator valve 28 is delivered to the torque converter 4 and the lubrication site 35 during propelling the vehicle by the engine 1; and a position in which the oil discharged from the electric oil pump 25 is delivered to the engagement device C and the hydraulic actuator 19, 20 while preventing the oil from being delivered to the torque converter 4 and the lubrication site 35.

A structure of the switching valve 34 will be described in more detail hereafter. As shown in FIG. 1, the switching valve 34 comprises a first input port 34a and a second input port 34b connected to the electric oil pump 25, a first output port 34c for delivering the oil to an oil passage 46 connected to the hydraulic actuator 20 and the second control valve 30, a second output port 34d connected to the torque converter 4 and the lubrication site 35, an input-output port 34e connected to the oil passage 33 extending on the discharging side of the modulator valve 28, and a drain port 34f connected to the oil pan 26. In addition, a spring 34h is disposed on one end of a spool 34g, and a feedback port 34i is arranged on the other end to apply a load established by a pressure from the electric oil pump 25 to the spool 34g in a direction to counteract to the elastic force of the spring 34h.

During propelling the vehicle by rotating the drive wheels 10 by the torque of the engine 1, the electric oil pump 25 is stopped and the spool 34g is pushed downwardly in FIG. 1 by the elastic force of the spring 34h. In this situation, communications are provided between the first input port 34a and the drain port 34f and between the input-output port 34e and the second output port 34d, and a communication between the second input port 34b and the first output port 34c is interrupted.

When the condition to stop the engine 1 by the S&S control is satisfied, the torque transmission between the engine 1 and drive wheels 10 is cutoff, and in addition, the engine 1 is stopped and the electric oil pump 25 is activated. In other words, the electric oil pump 25 is started upon satisfaction of the condition to start the S&S control before stopping the engine 1. When the electric oil pump 25 is started, hydraulic pressure in an oil passage 47 connected to the discharging side of the electric oil pump 25 has not yet been raised. In this situation, therefore, hydraulic pressure applied from the feedback port 34i is still low, and the spool 34g still stays at a lower side in FIG. 1 to keep the communication between the drain port 34i and the first input port 34a.

In the example shown in FIG. 1, in order to increase the hydraulic pressure in the oil passage 47 by preventing the oil discharged from the electric oil pump 25 from being completely drained, an orifice 49 is formed on an oil passage 48 extending from the discharging side of the drain port 34i. That is, a flow rate of the oil flowing through the oil passage 48 is restricted by the orifice 49 so that hydraulic pressure in the oil passage 47 is gradually increased. Consequently, hydraulic pressure applied to the feedback port 34i of the switching valve 34 is increased so that a load pushing the spool 34g upwardly in FIG. 1 exceeds the elastic force of the spring 34h to move the spool 34g upwardly. In this case, communications is provided between the first input port 34a and the first output port 34c and between the second input port 34b and the input-output port 34e, and communication between the drain port 34f and the second output port 34d is interrupted. That is, the oil discharged from the electric oil pump 25 is delivered to the hydraulic actuator 20 and to the oil passage 33. Thus, the oil is allowed to flow through the oil passage 33 irrespective of execution of the S&S control.

As described, when the switching valve 34 is switched to deliver the oil from the electric oil pump 25 to the hydraulic actuator 20, a communication between the first input port 34a and the first output port 34c is provided. Therefore, a switching pressure of the switching valve 34 is set to be higher than required pressures of the hydraulic actuator 20 and the engagement device C under the S&S control, but to be lower than a pressure resistance of the electric oil pump 25. That is, the elastic force of the spring 34h is set in such a manner not to open the switching valve 34 when the hydraulic pressure in the hydraulic actuator 20 is higher than the pressure resistance of the electric oil pump 26. For these reasons, shortage of the hydraulic pressure in the engagement device C and the hydraulic actuator 20 can be prevented, and a damage the electric oil pump 25 can be reduced. As also described, the electric oil pump 25 is activated to achieve the required pressure for the engagement device C or the hydraulic actuator 20 when the engine 1 is stopped and hence the hydraulic pressure generated by the mechanical oil pump 9, i.e., the hydraulic pressure in the oil passage 27 is reduced to be lower than a predetermined pressure. In addition, the elastic force of the spring 34h of the switching valve 34 is set in a manner such that the switching valve 34 is shifted when the engine 1 is stopped and hence the hydraulic pressure generated by the mechanical oil pump 9, i.e., the hydraulic pressure in the oil passage 27 is reduced to be lower than a predetermined pressure. Accordingly, the switching pressure by which the switching valve 34 is switched corresponds to the claimed predetermined pressure.

The electric current is applied to each linear solenoid valve SLS, SLP, SLC, SLU and SLT, and the electric oil pump 25 in accordance with signals from the electric control unit (ECU). For example, signals is transmitted to the ECU from a sensor for detecting an operation of a not shown accelerator pedal or a sensor for detecting a vehicle speed, a hydraulic pressure sensor S1 for detecting a hydraulic pressure in each oil passage, a not shown navigation system. The ECU calculates a torque and a speed of the engine 1 based on those incident signals, and supply the electric current to the linear solenoid valves SLS, SLP, SLC, SLU and SLT, and the electric oil pump 25 in accordance with the calculated torque and the speed of the engine 1. In addition, in order to determine a satisfaction of the condition to stop the engine 1, a signal for detecting condition of not shown auxiliaries is also transmitted to the ECU.

Next, an action of the hydraulic control system shown in FIG. 2 will be explained hereinafter. During a normal running where the vehicle is propelled while connecting the engine 1 to the drive wheels 10, the oil discharged from the mechanical oil pump 9 is delivered to the modulator valve 28, the first control valve 29 and the second control valve 30 through the check valve 31. The hydraulic pressure in the oil passage 27 connected to the mechanical oil pump 9 is regulated in accordance with a required driving force by the first regulator valve 32. The modulator valve 28 delivers the oil to each linear solenoid valve SLS, SLP, SLC, SLU and SLT based on the regulated line pressure as an initial pressure. The oil discharged from the modulator valve 28 is partially delivered to the torque converter 4 and the lubrication site 35 through the oil passage 33.

The hydraulic pressure based on the line pressure is applied to each hydraulic actuator 19, 20 in such a manner to achieve a target speed ratio in accordance with a vehicle speed or an opening degree of the accelerator. In this situation, the hydraulic pressure applied to the hydraulic actuator 20 is adjusted in such a manner to establish a sufficient torque transmitting capacity derived from friction between the belt 18 and each pulley 15, 17 that can avoid a slippage of the belt 18. When the hydraulic pressure in the oil passage 27 is increased with an increment of the speed of the engine 1, the first regulator valve 32 is opened to increase a delivery amount of the oil to the torque converter 4 and the lubrication site 35.

Accordingly, during the normal running, the oil can be delivered sufficiently to the torque converter 4 and the lubrication site 35 even if the speed of the engine 1 is low, and the first regulator valve 32 is not opened. Therefore, the running condition can be maintained, the friction contact members such as gears can be lubricated, or a power loss can be reduced.

During normal running, the electric oil pump 25 is started immediately before the engine 1 is stopped by the S&S control. For example, the electric oil pump 25 is started when hydraulic pressure detected by the hydraulic pressure sensor S1 may be decreased to a level at which the electric oil pump 25 is not damaged. Alternatively, the electric oil pump 25 may also be started to switch the switching valve 34 when the hydraulic pressure discharged from the mechanical oil pump 9 is decreased to be lower than a predetermined level by stopping the engine 1. In the beginning of activation of the electric oil pump 25, the hydraulic pressure in the oil passage 47 is still low and the elastic force of the spring 34h applied to the spool 34g of the switching valve 34 is greater than the hydraulic load applied to the spool 34g from the oil passage 47. In this situation, therefore, the position of the spool 34g of the switching valve 34 is maintained to the position during the normal running. Consequently, the air remaining in the oil passage 47 is discharged from the drain port 34f together with the oil discharged from the electric oil pump 25. For this reason, an air intrusion into the oil delivered by driving the electric oil pump 25 to the engagement device C and the hydraulic actuators 19 and 20 can be prevented.

As described, the orifice 49 is formed on the oil passage 48 to restrict a flow rate of the oil discharged from the electric oil pump 25 so that the hydraulic pressure in the oil passage 47 is gradually increased. When the hydraulic load applied to the spool 34g from the oil passage 47 exceeds the elastic force of the spring 34h applied to the spool 34, the switching valve 34 is switched. As described, the switching valve 34 is adapted to be switched when the hydraulic pressure in the oil passage 47 is higher than the pressure required by the engagement device C and the hydraulic actuators 19 and 20 during execution of the S&S control. Therefore, when the switching valve 34 is switched, the oil is allowed to be delivered from the oil passage 47 to the oil passage 33 through the engagement device C and also to each linear solenoid valve SLS, SLP, SLC, SLU and SLT. In addition, the oil discharged from the electric oil pump 25 is allowed to be delivered to the hydraulic actuator 20 through the oil passage 46. Given that the hydraulic pressure in the hydraulic actuator 20 is lower than a target pressure, the second control valve 30 is closed so that the oil may also be delivered to the first control valve 29 through the input port 30a of the second control valve 30.

When the hydraulic pressure in the hydraulic actuator 20 is increased to be higher than the target pressure, the second control valve 30 is switched to serve as a relief valve thereby draining the oil in the hydraulic actuator 20. That is, the hydraulic pressure in the hydraulic actuator 20 can be controlled by controlling the linear solenoid valve SLS applying the signal pressure $P_{SLS}$ to the second control valve 30. For example, when bringing the vehicle into the neutral state by releasing both of the clutch C2 and the dog clutch D1 while stopping the engine 1, a torque transmitting capacity and a belt clamping force may be lowered owing to the fact that the torque applied to the CVT 12 is small. In this situation, therefore, the hydraulic pressure in the hydraulic actuator 20 can be lowered by controlling the linear solenoid valve SLS. In addition, a discharging pressure of the electric oil pump 25 can be reduced in accordance with a control value of the linear solenoid valve SLS. For these reasons, electric consumption to activating the electric oil pump 25 can be reduced so that fuel efficiency can be improved.

As described, the switching valve 34 is adapted to inhibit a delivery of the oil from the electric oil pump 25 to the engagement device C and the hydraulic actuators 19 and 20, while allowing the oil discharged from the electric oil pump 25 to be drained through the oil passage 48, when the mechanical oil pump 9 is driven by the engine 1 to deliver the oil to the engagement device C and the hydraulic actuators 19 and 20. The switching valve 34 is further adapted to establish a communication between the electric oil pump 25 and the engagement device C, the hydraulic actuators 19 and 20 through the oil passage 33 during execution of the S&S control. Therefore, the oil can be delivered from the electric oil pump 25 to the hydraulic actuator 20 and the engagement device C during execution of the S&S control. As also described, the electric oil pump 25 is started prior to deliver the oil from the electric oil pump 25 to the hydraulic actuator 20 and the engagement device C. Therefore, the air remaining in the oil passage 47 can be discharged before the switching valve 34 is switched in such a manner to allow the oil from the electric oil pump 25 to be delivered to the hydraulic actuator 20 and the engagement device C. As a result, deterioration in controllability or control response of the hydraulic actuator 20 and the engagement device C can be avoided during execution of the S&S control. In addition, during execution of the S&S control, the oil may also be delivered to the engagement device C through the oil passage 33 for delivering oil to the torque converter 4 and the lubrication site 35 during the normal running. That is, the oil passage 33 may be used not only to deliver the oil from the electric oil pump 25 to the torque converter 4 and the lubrication site 35 during the normal running but also to deliver the oil to the engagement device C during execution of the S&S control. Therefore, the hydraulic circuit can be prevented from being increased in its size. Further, since the oil will not be delivered from the electric oil pump 25 to the torque converter 4 and the lubrication site 35 during execution of the S&S control, a smaller motor may be used as the electric oil pump 25.

In addition, during execution of the S&S control, a speed ratio for restarting the vehicle by delivering the torque to the drive wheels 10 through the torque reversing device 6 and the gear train 13 can be established by merely delivering the oil to the engagement device C without requiring time to bring the engagement device C into engagement. Therefore, the vehicle is allowed to be accelerated promptly in response to a drive demand without delay. When the S&S control is executed during propulsion, a speed ratio or a torque transmitting capacity can be changed in accordance with a vehicle speed. Therefore, an engagement shock of the clutch C2 as well as a slippage of the belt 18 on the occasion of reaccelerating the vehicle can be prevented.

When the engine 1 stopped by the S&S control is restarted while during propelling the vehicle, more specifically, when a complete combustion of the engine 1 is achieved, the motor 45 is stopped and hence the mechanical oil pump 25 stops discharging the oil. That is, when the engine 1 starts running stably, the motor 45 is stopped. Consequently, the spool 34g of the switching valve 34 is moved downwardly. If the spool 34g of the switching valve 34 cannot be moved downwardly due to a failure when starting the S&S control, the hydraulic pressure applied to the first output port 34c of the switching valve 34 is detected by the hydraulic pressure sensor S1. If the detected hydraulic pressure is higher than a predetermined level, the motor 45 is stopped to prevent a step-out thereof caused by an excessive rise in the hydraulic pressure applied to the electric oil pump 25.

Even when an ignition switch is turned off, the oil can be delivered from the electric oil pump 25 to the linear solenoid valve SLU for controlling the lockup clutch 8. Therefore, the engine 1 may also be started by torque from the drive wheels 10 even during towing the vehicle. In this case, the mechanical oil pump 9 may also be driven so that the electric oil pump 25 can be stopped to allow the oil to be delivered to the torque converter 4 and the lubrication site 35 through the oil passage 33. For this reason, the torque reversing device 6 and gear trains 13 and 22 can be prevented from being damaged. In addition, the discharging pressure of the mechanical oil pump 9 can be increased by increasing the speed of towing the vehicle so that the first regulator valve 32 and the second regulator valve 40 can be opened to increase delivery of the oil to the torque converter 4 and the lubrication site 35. Further, since the oil is delivered also to a contact site between the belt 18 and each pulley 19 and 20, a speed change operation may also be carried out. In this situation, the speed ratio of the CVT 12 can be increased by delivering the oil from the electric oil pump 25 to the hydraulic actuator 20 so that the discharging pressure of the mechanical oil pump 9 can be further increased.

Figure 3:
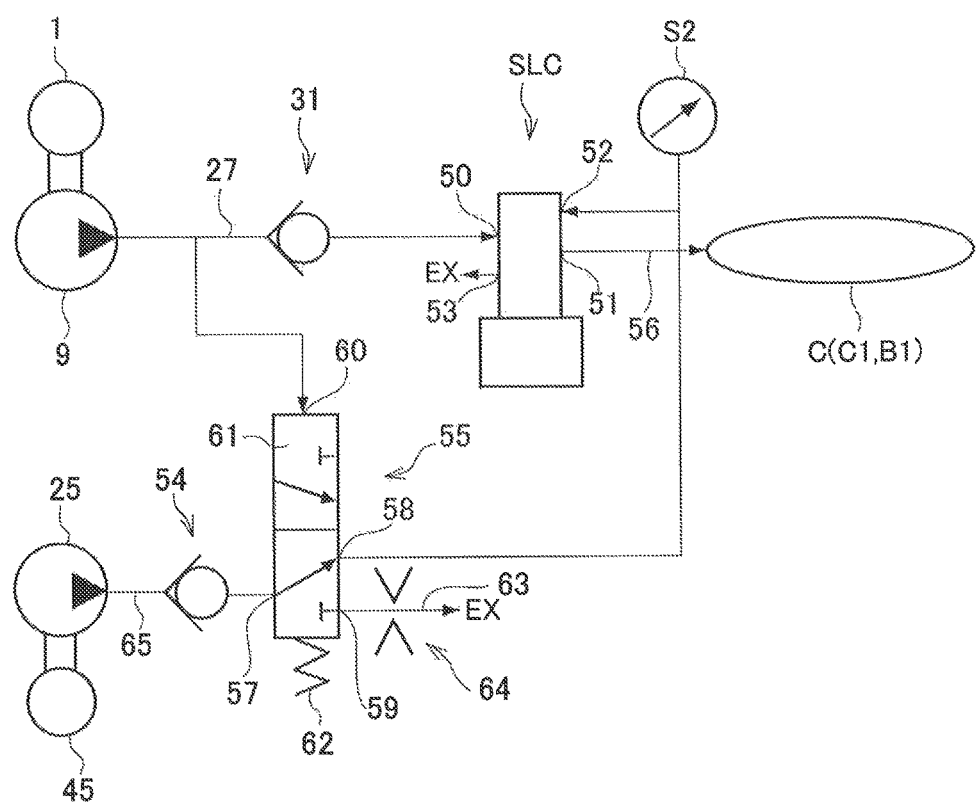
FIG. 3 is a hydraulic circuit diagram showing another example of the hydraulic control system configured to deliver the oil from the electric oil pump to the engagement device.

Next, another example of the hydraulic circuit of the hydraulic control system with reference to a hydraulic diagram shown in FIG. 3. In FIG. 3, common reference numerals are allotted to the elements in common with those in the example shown in FIG. 1, and detailed explanation for those common elements will be omitted. Here, it is to be noted that only a main structure of the hydraulic control system is illustrated in FIG. 3 and remaining structure thereof is omitted. In the hydraulic circuit shown in FIG. 3, the mechanical oil pump 9 driven by the torque of the engine 1 serves as a hydraulic source. The pressure of the oil discharged from the mechanical oil pump 9 is regulated to a predetermined level by a not shown regulator valve, and the oil thus regulated is delivered to the linear solenoid valve SLC through the check valve 31. Optionally, a modulator valve may be disposed between the check valve 31 and the linear solenoid valve SLC.

The linear solenoid valve SLC comprises an input port 50 to which the oil is delivered from the mechanical oil pump 9 through the check valve 31, an output port 51 discharging the oil to the engagement device C, a feedback port 52 to which the hydraulic pressure of the engagement device C is applied, and a drain port 53 connected to a not shown oil pan. The linear solenoid valve SLC is adapted to switch a connection of ports based on a load established by the hydraulic pressure applied to the feedback port 52, an elastic force of a not shown spring, and an electromagnetic force established in accordance with a current applied thereto. Specifically, when a load established by the hydraulic pressure delivered to the feedback port 52 is smaller than a total pressure of the elastic force of the spring and the electromagnetic force, a communication between the input port 50 and the output port 51 is provided. By contrast, when a load established by the hydraulic pressure delivered to the feedback port 52 is larger than a total pressure of the elastic force of the spring and the electromagnetic force, a communication between the output port 51 and the drain port 52 is provided. More specifically, the communication between the input port 50 and the output port 51 is established by increasing the current applied to the linear solenoid valve SLC so as to increase the hydraulic pressure applied to the engagement device C. By contrast, the hydraulic pressure applied to the engagement device C can be reduced by reducing the current applied to the linear solenoid valve SLC to establish a communication between the output port 51 and the drain port 53. That is, the linear solenoid valve SLC shown in FIG. 3 is a normally closed linear solenoid valve, and the hydraulic pressure applied to the engagement device C can be adjusted by controlling the electromagnetic force while altering a current applied thereto. In short, the hydraulic pressure applied to the engagement device C is controlled in accordance with the current value applied to the linear solenoid valve SLC.

In the hydraulic circuit thus structured, the engagement device C is controlled based on the hydraulic pressure established by the mechanical oil pump 9 driven by the engine 1. When the engine 1 is stopped by the S&S control, the mechanical oil pump 9 is not available to discharge the oil. For this reason, the electric oil pump 25 activated by the motor 45 is arranged to serve as another hydraulic source. The oil discharged from the electric oil pump 25 is delivered to the engagement device C through a check valve 54 for preventing the oil to flow toward the electric oil pump 25 and a below-mentioned switching valve 55. Specifically, the electric oil pump 25 is connected to the solenoid valve SLC and the engagement device C through an oil passage 56 on which a switching valve 55 is disposed. Accordingly, the check valve 54 serves as the claimed second check valve.

As described, the electric oil pump 25 is arranged to deliver the oil to the engagement device C during execution of the S&S control. To this end, in the example shown in FIG. 3, the switching valve 55 is arranged to provide a connection between the electric oil pump 25 and the engagement device C when the hydraulic pressure established by the mechanical oil pump 9 falls below a predetermined level during execution of the S&S control. The switching valve 55 as a spool valve comprises a first input port 57 to which the oil discharged from the electric oil pump 25 is delivered, a first output port 58 connected to the engagement device C, and a drain port 59 connected to the oil pan. The switching valve 55 further comprises a signal pressure port 60 to which the output pressure of the mechanical oil pump 9 is applied, and a spring 62 applying an elastic force to a spool 61 in a direction to counteract a load established by the hydraulic pressure delivered from the signal pressure port 60. In addition, an orifice 64 is formed on an oil passage 63 for the oil discharged from the drain port 59.

In the switching valve 55 shown in FIG. 3, a communication between the first input port 57 and the drain port 59 is provided when a load pushing the spool 61 according to the hydraulic pressure from the signal pressure port 60 is greater than the elastic force, and a communication between the first input port 57 and the first output port 58 is provided when the load pushing the spool 61 according to the hydraulic pressure from the signal pressure port 60 is smaller than the elastic force. When the oil is discharged from the mechanical oil pump 9 driven by the engine 1 during propulsion of the vehicle, the hydraulic pressure applied to the signal pressure port 60 of the switching valve 55 is relatively high. In this situation, a load pushing the spool 61 according to the hydraulic pressure applied from the signal pressure port 60 exceeds the elastic force so that a communication between the first input port 57 and the drain port 59 is provided. By contrast, when the oil is not discharged from the mechanical oil pump 9 while stopping the engine 1 by executing the S&S control, the hydraulic pressure applied to the signal pressure port 60 of the switching valve 55 is relatively low. In this situation, a load pressing the spool 61 according to the hydraulic pressure applied from the signal pressure port 60 falls below the elastic force so that a communication between the first input port 57 and the first output port 58 is provided. In order to detect the hydraulic pressure of the engagement device C, a hydraulic pressure sensor S2 is arranged.

Next, an action of the hydraulic control system shown in FIG. 3 will be explained hereinafter. When the oil is discharged from the mechanical oil pump 9 driven by the engine 1, the hydraulic pressure applied to the engagement device C is controlled by the linear solenoid valve SLC based on the initial pressure established by the oil discharged from the mechanical oil pump 9. Specifically, the hydraulic pressure applied to the engagement device C is controlled by applying electric current to the linear solenoid valve SLC depending on the required engagement pressure of the engagement device C. Meanwhile, when the condition to stop the engine 1 by the S&S control is satisfied, the electric oil pump 25 is started prior to stopping the engine 1. Consequently, both the mechanical oil pump 9 and the electric oil pump 25 are activated temporarily. In this situation, a predetermined hydraulic pressure is applied to the signal pressure port 60 of the switching valve 55 to provide a communication between the first input port 57 and the drain port 59 so that the oil discharged from the electric oil pump 25 is drained to the oil pan. For this reason, the remaining air in an oil passage 65 connected to the electric oil pump 25 and to the switching valve 55 is discharged to the oil pan with the oil discharged from the drain port 59. In this situation, the oil discharged from the electric oil pump 25 can be prevented from being drained entirely to the oil pan by the orifice 64 arranged on the oil passage 63, and consequently the hydraulic pressure in the oil passage 65 connected to the electric oil pump 25 and the switching valve 55 is raised gradually.

Thus, the electric oil pump 25 is started in advance of stopping the engine 1 so that the air remaining in the oil passage 65 can be discharged from output side of the electric oil pump 25. For this reason, air intrusion in the oil delivered from the electric oil pump 25 to the engagement device C through the switching valve 55 can be solved. Accordingly, deterioration in controllability or hydraulic response of the engagement device C can be avoided while delivering the oil from the electric oil pump 25 to the engagement device C. In addition, a drainage of the oil from the electric oil pump 25 can be reduced by the orifice 64 arranged on the oil passage 63 connected to the drain port 59 so that the hydraulic pressure established by the oil discharged from the electric oil pump 25 can be raised promptly.

When starting a stopping operation of the engine 1 while activating both the mechanical oil pump 9 and the electric oil pump 25, the hydraulic pressure of the oil delivered to the signal pressure port 60 of the switching valve 55 is lowered gradually. Consequently, when the pressure applied to the signal pressure port 60 of the switching valve 55 falls below the predetermined level, the switching valve 55 is switched in such a manner to connect the first input port 57 and the first output port 58 to provide a communication between the electric oil pump 25 and the engagement device C. The hydraulic pressure applied to the signal port 60 to switch the switching valve 55 (i.e., a switching pressure) is preferably raised to be higher than a pressure required to bring the engagement device C into engagement. In other words, the elastic force of the spring 62 is preferably set in a manner to exceed the hydraulic load applied to the spool 61 even when the hydraulic pressure applied to the signal port 60 of the switching valve 55 is higher than the maximum required pressure of the engagement device C.

The hydraulic pressure applied to the engagement device C before switching the switching valve 55 can be maintained always to be higher than the hydraulic pressure required by the engagement device C by thus setting the switching pressure, i.e., the elastic force of the spring 62. In addition, capacity of the electric oil pump 25 is sufficient to achieve the hydraulic pressure higher than the required engagement pressure of the engagement device C so that the required engagement pressure of the engagement device C can be achieved even after switching the switching valve 55. Therefore, temporal shortage of the hydraulic pressure applied to the engagement device C can be prevented before and after switching the switching valve 55.

In order to prevent backflow of the oil from the engagement device C to the electric oil pump 25 when the switching valve 55 is switched in such a manner to provide a communication between the first input port 57 and the first output port 58, the switching pressure applied to the switching valve 55 is kept to be lower than the maximum pressure achieved by the electric oil pump 25. For this reason, an input pressure to the switching valve 55 can be maintained to be higher than the output pressure thereof even after switching the switching valve 55 in the above-mentioned manner so that the oil can be prevented from being temporarily discharged from the engagement device C. Therefore, temporal shortage of the hydraulic pressure of the engagement device C caused by switching the switching valve 55 can be prevented.

As described, when the oil discharged from the electric oil pump 25 is delivered to the engagement device C, the electric current applied to the linear solenoid valve SLC is controlled by the same manner as the oil is delivered from the mechanical oil pump 9 to the engagement device C. That is, a communication between the input port 50 and the output port 51 is established in the linear solenoid valve SLC when the hydraulic pressure applied to the engagement device C is lower than the required pressure. However, in the hydraulic circuit, the passages connecting the check valve 31 disposed between the mechanical oil 9 and the input port 50 to the engagement device C is closed by the check valve 31 so that the hydraulic pressure therein can be raised by electric oil pump 25. On the contrary, when the hydraulic pressure applied to the engagement device C is higher than the required pressure, a communication between the output port 51 and the drain port 53 is established in the linear solenoid valve SLC so that the hydraulic pressure applied to the engagement device C is reduced. That is, the linear solenoid valve SLC serves as a relief valve in this situation. Thus, the linear solenoid valve SLC can be used as the relief valve while discharging the oil from the electric oil pump 25 so that increment in size of the hydraulic control system can be avoided.

In addition, the discharging pressure of the electric oil pump 25 can controlled by controlling the electric current applied to the motor 45 so that the hydraulic pressure discharged from the electric oil pump 25 can be optimally controlled in accordance with the required pressure of the engagement device C. For example, when a position of the shift lever is switched from "D" to "N" during execution of the S&S control, current supply to the electric oil pump 25 is stopped. That is, the output pressure of the electric oil pump 25 is controlled in accordance with the required pressure of the engagement device C so that the electric oil pump 25 can be prevented from being driven excessively, and hence current and fuel consumption can be saved.

When the not shown accelerator pedal is depressed and the S&S control is terminated to start the engine 1 while delivering the oil from the electric oil pump 25 to the engagement device C, discharging pressure of the mechanical oil pump 9 is increased with an increase in the engine speed. Eventually, the hydraulic pressure applied to the signal pressure port 60 of the switching valve 55 exceeds the switching pressure so that the communication between the first input port 57 and the first output port 58 is interrupted. In this situation, the hydraulic pressure based on the initial pressure established by the mechanical oil pump 9 is applied to the engagement device C through the linear solenoid valve SLC. Then, after the complete combustion of the engine 1 is achieved, the electric oil pump 25 is stopped. Accordingly, the output pressure of the mechanical oil pump 9 or a hydraulic pressure in the oil passage 27 when switching the switching valve 55 corresponds to the claimed predetermined level.

When the engine 1 is stopped by turning off the ignition switch, the hydraulic pressure applied to the signal pressure port 60 of the switching valve 55 is lowered so that the switching valve 55 is switched by an elastic force of the spring 62 in such a manner to provide a communication between the first input port 57 and the first output port 58. In this situation, drainage of the oil from the engagement device C resulting from back flow of the oil toward the electric oil pump 25 can be prevented by the check valve 54 arranged between the first input port 57 and the electric oil pump 25.

According to the example shown in FIG. 3, if a communication between the first input port 57 and the first output port 58 in the switching valve 55 is fixed due to a failure while the engine 1 is being driven, the hydraulic pressure in the downstream side of the check valve 54 would be raised excessively and hence the check valve 54 may not be opened even if the electric oil pump 35 is started before stopping the engine 1 upon satisfaction of the executing condition of the S&S control. In order to avoid such disadvantage, the electric oil pump 25 is stopped when the hydraulic pressure detected by the hydraulic pressure sensor S2 is higher than the predetermined level, that is, when the hydraulic pressure sensor S2 detects the higher pressure than a maximum possible pressure achieved by the electric oil pump 25. Thus, the electric oil pump 25 is stopped when the hydraulic pressure detected by the hydraulic pressure sensor S2 exceeds the predetermined level so that step-out of the motor 45 resulting from operating the electric oil pump 25 under the condition that the check valve 54 cannot be opened can be avoided.

Figure 4:
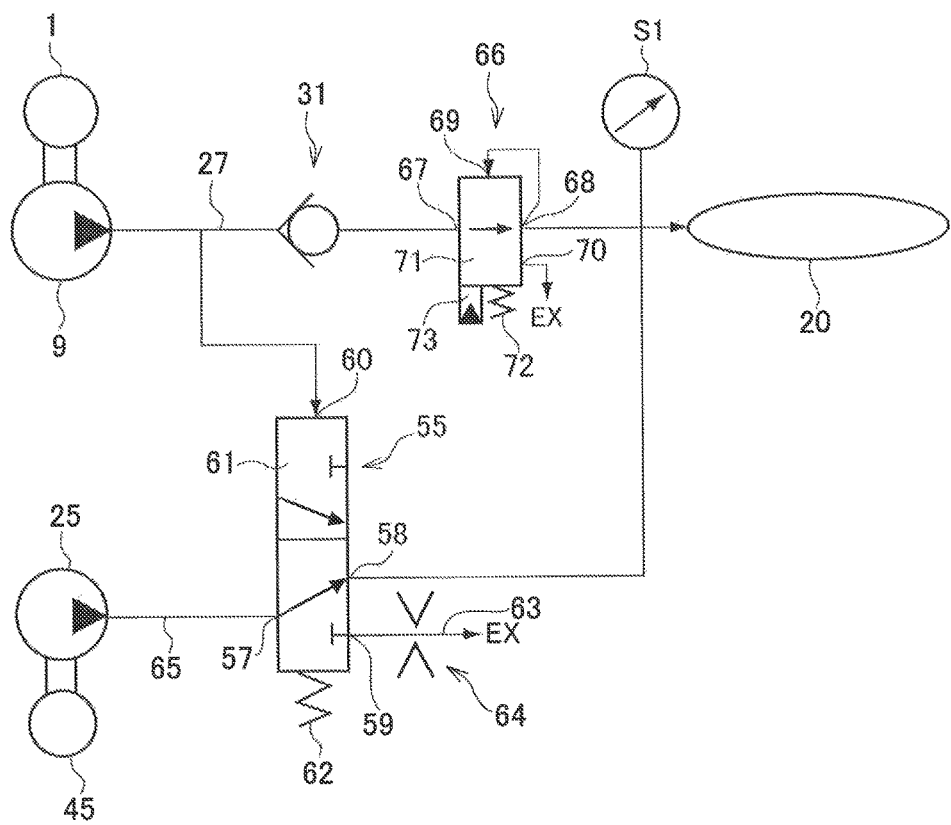
FIG. 4 is a hydraulic circuit diagram showing still another example of the hydraulic control system configured to deliver the oil from the electric oil pump to the hydraulic actuator.

Next, still another example of the hydraulic control system configured to deliver the oil from the electric oil pump 25 to the hydraulic actuator 20 will be explained with reference to the hydraulic diagram shown in FIG. 4. In FIG. 4, common reference numerals are allotted to the elements in common with those shown in FIGS. 1 to 3, and detailed explanations for those common elements will be omitted. In the example shown in FIG. 4, the first output port 58 of the switching valve 55 is connected to the hydraulic actuator 20 so as to allow the oil to be delivered from the electric oil pump 25 to the hydraulic actuator 20. As the example shown in FIG. 1, the hydraulic pressure sensor S1 is also arranged to detect the hydraulic pressure applied to the hydraulic actuator 20.

According to the example shown in FIG. 4, a third control valve 66 as a solenoid valve actuated by an electromagnetic force is used instead of the second control valve 30 shown in FIG. 1 to which the signal pressure $P_{SLS}$ is applied. The third control valve 66 comprises an input port 67 connected to the mechanical oil pump 9 through the check valve 31, an output port 68 connected to the hydraulic actuator 20, a feedback port 69 to which the hydraulic pressure of the hydraulic actuator 20 is applied, and a drain port 70 connected to the oil pan. In the third control valve 66, an elastic force of a spring 72 and an electromagnetic force of a solenoid 73 are applied to one side of a spool 71, and a load established by hydraulic pressure applied from the feedback port 69 is applied to other side of the spool 71 in a direction to counteract to the elastic force of the spring 72. In this example, therefore, communications between the input port 67 and the output port 68 and between the output port 68 and the drain port 70 are established by controlling the electromagnetic force. That is, the hydraulic pressure applied to the hydraulic actuator 20 is controlled by controlling electric current applied to the solenoid 73.

In the vehicle to which the hydraulic control system shown in FIG. 4 is applied, it is preferable to reduce a speed ratio in case of towing the vehicle. Specifically, in order to reduce torque applied the torque reversing device 6 from the drive wheels 10 during towing the vehicle, a speed ratio of the CVT 12 is preferably increased in such a manner that a speed of the primary pulley 15 is raised to be higher than that of the secondary pulley 17. To this end, in the example shown in FIG. 4, a check valve is not arranged on the oil passage 65 between the electric oil pump 25 and the switching valve 55. In the hydraulic control system thus structured, the oil is still allowed to be discharged from the hydraulic actuator 20 to the electric oil pump 25 so that an upshifting of CVT 12 can be executed even when the ignition switch is turned off. For this reason, the torque applied to the torque reversing device 6 during towing the vehicle can be decreased so that damage of the torque reversing device 6 can be reduced. Although the destination of the oil delivered from the electric oil pump 25 differs between the examples shown in FIGS. 3 and 4, functions of the hydraulic control systems shown in FIGS. 3 and 4 are similar to each other except for the function of the check valve 54.

Figure 5:
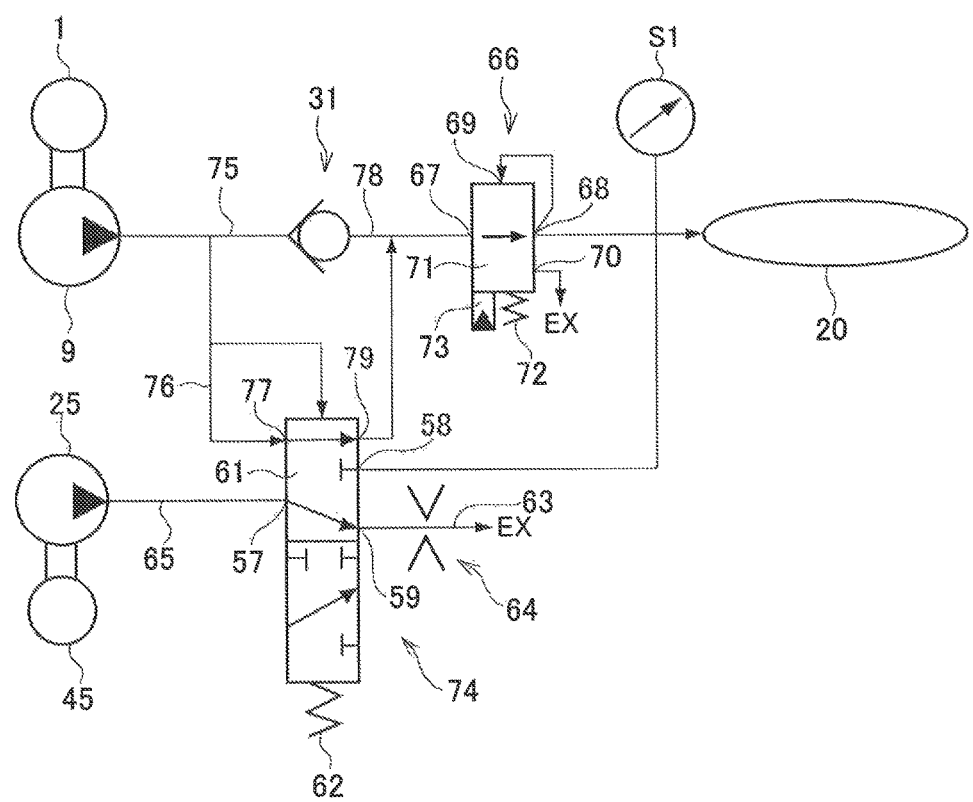
FIG. 5 is a hydraulic circuit diagram showing a modification example of the hydraulic control system configured to allow the oil to be delivered from the mechanical oil pump to the hydraulic actuator during occurrence of a failure in the check valve shown in FIG. 4.

In the example shown in FIG. 4, if the check valve 31 cannot be opened due to a failure, the oil may not be delivered from the mechanical oil pump 9 to the hydraulic actuator 20. Turning to FIG. 5, there is shown a modification example configured to allow the oil to be delivered to the hydraulic actuator 20 even during occurrence of such failure. Structures of the hydraulic control system shown in FIG. 5 are similar to those of the hydraulic control system shown in FIG. 4 except for a structure of the switching valve 55. In FIG. 5, accordingly, common reference numerals are allotted to the elements in common with those shown in FIG. 4, and detailed explanations for the common elements will be omitted.

In the hydraulic control system shown in FIG. 5, the oil can be delivered from the mechanical oil pump 9 to the third control valve 66 through a switching valve 74 while detouring the check valve 31. Specifically, the switching valve 74 comprises a second input port 77 connected to an oil passage 76 branching from an oil passage 75 connected to the mechanical oil pump 9 and the check valve 31, and a second output port 79 connected to an oil passage 78 connected to the check valve 31 and the third control valve 66. As the example shown in FIG. 4, the switching valve 74 further comprises the first input port 57, the first output port 58 and the drain port 59. According to the example shown in FIG. 5, when the discharging pressure of the mechanical oil pump 9 is higher than a predetermined level so that a communication between the first input port 57 and the drain port 59 is established, a communication between the second input port 77 and the second output port 79 is also established. By contrast, the discharging hydraulic pressure of the mechanical oil pump 9 is lower than the predetermined level so that a communication between the first input port 57 and the first output port 58 is established to deliver the oil from the electric oil pump 25 to the hydraulic actuator 20, the communication between the second input port 77 and the second output port 79 is interrupted.

Even when the check valve 31 cannot be opened due to a failure, the oil is still allowed to be delivered to the hydraulic actuator 20 through the switching valve 74 thus structured and the third control valve 66. Therefore, a speed ratio of the CVT 20 still can be increased during occurrence of such failure to achieve a required drive force. In addition, the oil still can be delivered to the hydraulic actuator 20 through the check valve 31 even during occurrence of the stuck of the switching valve 74 in a position to establish a communication between the first input port 57 and the first output port 58. Therefore a speed ratio of the CVT 20 still can be increased to achieve a required drive force even during occurrence of such failure of the switching valve 74. Thus, the oil can be delivered from the mechanical oil pump 9 to the hydraulic actuator 20 even during occurrence of failure of any one of the check valve 31 and the switching valve 74 by delivering the oil to the hydraulic actuator 20 through the switching valve 74 while detouring the check valve 31.

Figure 6:
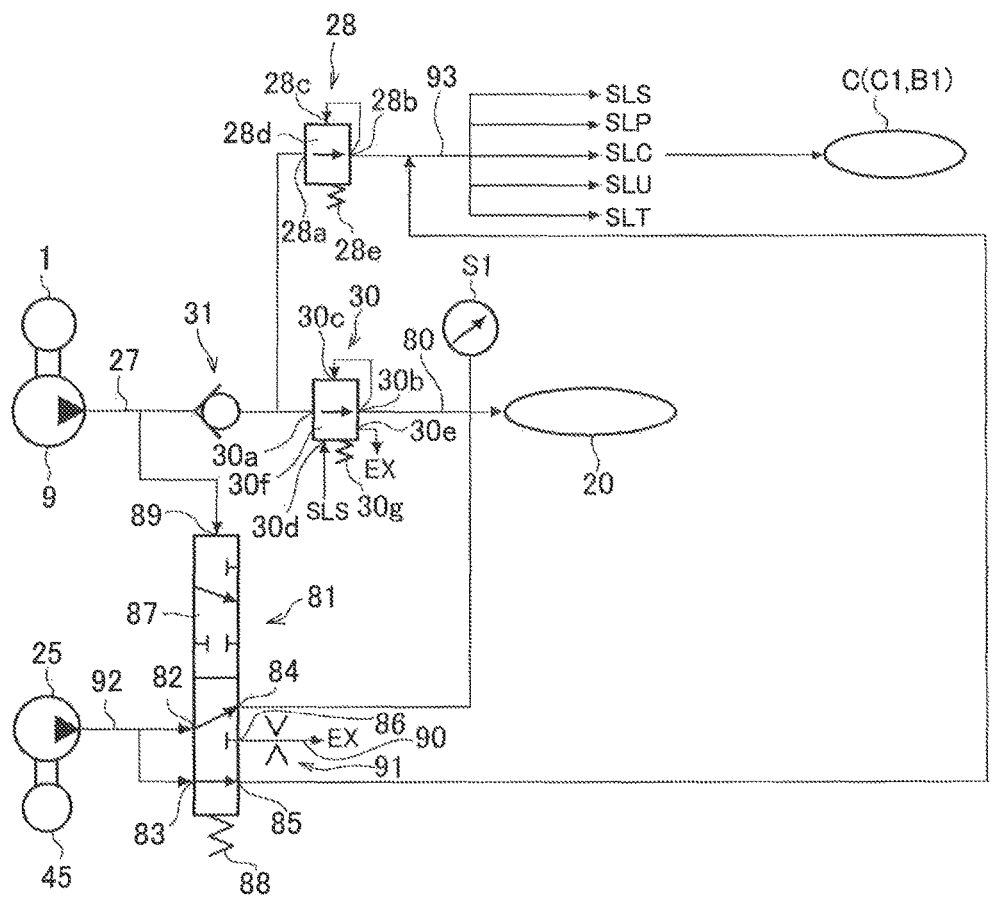
FIG. 6 is a hydraulic circuit diagram showing an example configured to deliver the oil from the electric oil pump to the engagement device and to the hydraulic actuator.

Turning to FIG. 6, there is shown still another example of the hydraulic control system in which the oil can be supplied from the electric oil pump 25 to the hydraulic actuator 20 and to the engagement device C. In FIG. 6, common reference numerals are allotted to the elements in common with those in the example shown in FIGS. 1 and 3 to 5, and detailed explanation for those common elements will be omitted. In the hydraulic control system shown in FIG. 6, the oil discharged from the mechanical oil pump 9 is delivered to the modulator valve 28 and the second control valve 30 through the check valve 31 in common with those in the example shown in FIG. 1. In addition, the hydraulic pressure regulated by the modulator valve 28 is applied to each linear solenoid valve SLS, SLP, SLC, SLU and SLT. The hydraulic pressure of the hydraulic actuator 20 is controlled by the second control valve 30, and the hydraulic pressure sensor S1 for detecting the hydraulic pressure of the hydraulic actuator 20 is disposed to detect the hydraulic pressure in an oil passage 80 connected to the second control valve 30 and the hydraulic actuator 20. Although not especially shown in FIG. 6, the regulator valves 32, 40 and 42, the first control valve 29 and the hydraulic actuator 19 may be disposed as the example shown in FIG. 1.

According to the hydraulic control system shown in FIG. 6, the oil can be delivered from the electric oil pump 25 to the hydraulic actuator 20 and each linear solenoid valve SLS, SLP, SLC, SLU and SLT. Specifically, when the hydraulic pressure of the oil discharged from the mechanical oil pump 9 is reduced to be lower than a predetermined level, a switching valve 81 disposed on the output side of the electric oil pump 25 is switched in such a manner to provide communications between the electric oil pump 25 and the hydraulic actuator 20 as well as the linear solenoid valves SLS, SLP, SLC, SLU and SLT.

Here will be explained a structure of the switching valve 81 in more detail. The switching valve 81 shown in FIG. 6 comprises a first input port 82 and a second input port 83 those connected to the electric oil pump 25, a first output port 84 connected to the hydraulic actuator 20, a second output port 85 connected to each linear solenoid valve SLS, SLP, SLC, SLU and SLT, and a drain port 86 connected to the oil pan. In the switching valve 81 as a spool valve, a spring 88 is disposed on one end of a spool 87, and a signal pressure port 89 is arranged on the other end to apply a load established by an output pressure of the electric oil pump 9 to the spool 87 in a direction to counteract to the elastic force of the spring 88. When the load established by the pressure applied from the signal pressure port 89 exceeds the elastic force, a communication between the first input port 82 and the drain port 86 is provided, to other ports 83, 84 and 85 are closed. By contrast, when the load established by the pressure applied from the signal pressure port 89 falls below the elastic force, communications between the first input port 82 and the first output port 84 and between the second input port 83 and the second output port 85 are established, and the drain port 86 is closed. Additionally, an orifice 91 is arranged on an oil passage 90 in the output side of the drain port 86.

Action of the hydraulic control system shown in FIG. 6 during operation of the engine 1 is similar to that of the example shown in FIG. 1. When the condition for stopping the engine 1 by the S&S control is satisfied, the electric oil pump 25 is started before stopping the engine 1. During operation of the engine 1, a communication between the first input port 82 and the drain port 86 of the switching valve 81 is established. In this situation, the air remaining in an oil passage 92 of an output side of the electric oil pump 25 can be discharged by starting the electric oil pump 25 to the oil pan with the oil discharged from the electric oil pump 25. In addition, since the orifice 91 is arranged on the oil passage 90 in the output side of the drain port 86, the oil discharged from the electric oil pump 25 can be prevented from being discharged entirely. Consequently, the hydraulic pressure in the oil passage 92 at the output side of the electric oil pump 25 is increased gradually. Thus, the air remaining in the oil passage 92 at the output side of the electric oil pump 25 can be discharged by driving the electric oil pump 25 in advance of stopping the engine 1. In addition, the hydraulic pressure in the oil passage 92 can be increased by the orifice 91 arranged on the oil passage 90.

Then, the hydraulic pressure applied to the signal pressure port 89 of the switching valve 81 is lowered when the engine 1 is stopped, and hence the spool 87 of the switching valve 81 is moved by the elastic force of the spring 88. Specifically, communications between the first input port 82 and the first output port 84 and between the second input port 83 and the second output port 85 are established, and the drain port 86 is closed. In this situation, the oil discharged from the electric oil pump 25 is delivered to the hydraulic actuator 20 and each linear solenoid valve SLS, SLP, SLC, SLU and SLT. Therefore, the hydraulic pressures applied to the hydraulic actuator 20, each linear solenoid valve SLS, SLP, SLC, SLU and SLT, as well as the engagement device C can be controlled based on the hydraulic pressure established by the electric oil pump 25. In addition, air intrusion in the oil may be solved by starting the electric oil pump 25 to deliver the oil to the hydraulic actuator 20 and each linear solenoid valve SLS, SLP, SLC, SLU and SLT. Therefore, deterioration in controllability and hydraulic response of the hydraulic actuator 20 and each linear solenoid valve SLS, SLP, SLC, SLU and SLT can be avoided.

In addition, according to the hydraulic control system shown in FIG. 6, a communication between the first input port 82 and the second input port 83 of the switching valve 81 may be established, and consequently a communication between the hydraulic actuator 20 and an oil passage 93 of an input side of each linear solenoid valve SLS, SLP, SLC, SLU and SLT may be established. In this situation, the hydraulic pressure in the hydraulic actuator 20 is equalized to that in the oil passage 93. Accordingly, the hydraulic pressure in the oil passage 93 can be detected or measured by the hydraulic pressure sensor S1 detecting the pressure in the hydraulic actuator 20. An output pressure of each linear solenoid valve SLS, SLP, SLC, SLU and SLT is decreased with a decrease in the input pressure thereto. More specifically, output pressures of those solenoid valves are varied in accordance with the hydraulic pressures applied thereto even if the electric currents applied thereto are constant.

Figure 7:
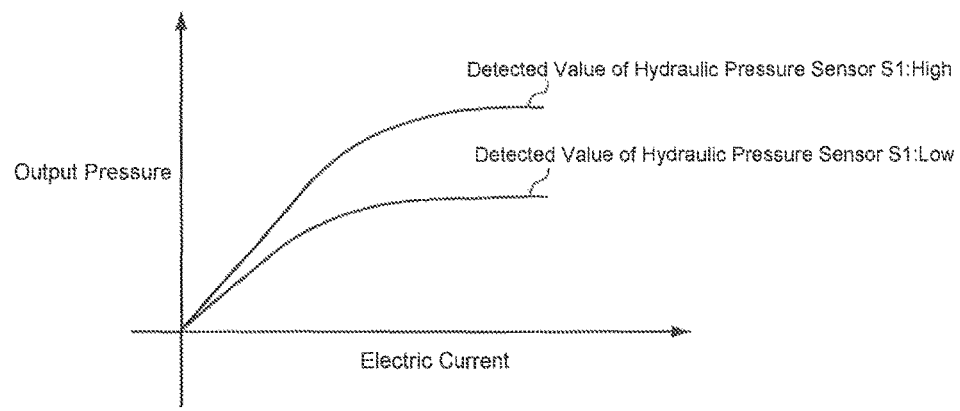
FIG. 7 is a graph for explaining the means for correcting electric current applied to the linear solenoid valve.

In the hydraulic control system shown in FIG. 6, a current value applied to each linear solenoid valve SLS, SLP, SLC, SLU and SLT in accordance with the hydraulic pressure detected by the hydraulic pressure sensor S1 is corrected. As described, the hydraulic pressure applied to the solenoid valve from the mechanical oil pump 9 is relatively high, and the hydraulic pressure applied to the solenoid valve from the electric oil pump 25 is relatively low. Accordingly, in case the hydraulic pressure is applied to the solenoid valve from the mechanical oil pump 9, a current value applied to the solenoid valve is controlled in line with the curve shown in FIG. 7 for the case in which the pressure detected by the hydraulic pressure sensor S1 is high. By contrast, in case the hydraulic pressure is applied to the solenoid valve from the electric oil pump 25, a current value applied to the solenoid valve is controlled in line with the curve shown in FIG. 7 for the case in which the pressure detected by the hydraulic pressure sensor S1 is low. However, the hydraulic pressure detected by the hydraulic pressure sensor S1 may be changed even during activation of the electric oil pump 25. In this case, the current value applied to the linear solenoid valves SLS, SLP, SLC, SLU or SLT is corrected in accordance with the hydraulic pressure detected by the hydraulic pressure sensor S1. Thus, the current value applied to the linear solenoid valves SLS, SLP, SLC, SLU or SLT is corrected in accordance with the hydraulic pressure detected by the hydraulic sensor S1 so that a deterioration in the controllability and the hydraulic response of the engagement device C can be avoided.

The output pressure of each linear solenoid valve SLS, SLP, SLC, SLU and SLT in accordance with the hydraulic pressure and the current applied thereto can be calculated by structural properties of the linear solenoid valve. Specifically, the current value applied to each linear solenoid valve SLS, SLP, SLC, SLU and SLT can be corrected with reference to a map prepared in advance based on a result of experiment or simulation, or prepared based on a design of the solenoid valve. Accordingly, the linear solenoid valves SLS, SLP, SLC, SLU and SLT respectively serve as the claimed first linear solenoid valve, and a means correcting the current value applied to each linear solenoid valve SLS, SLP, SLC, SLU and SLT corresponds to the claimed correction means.

Figure 8:
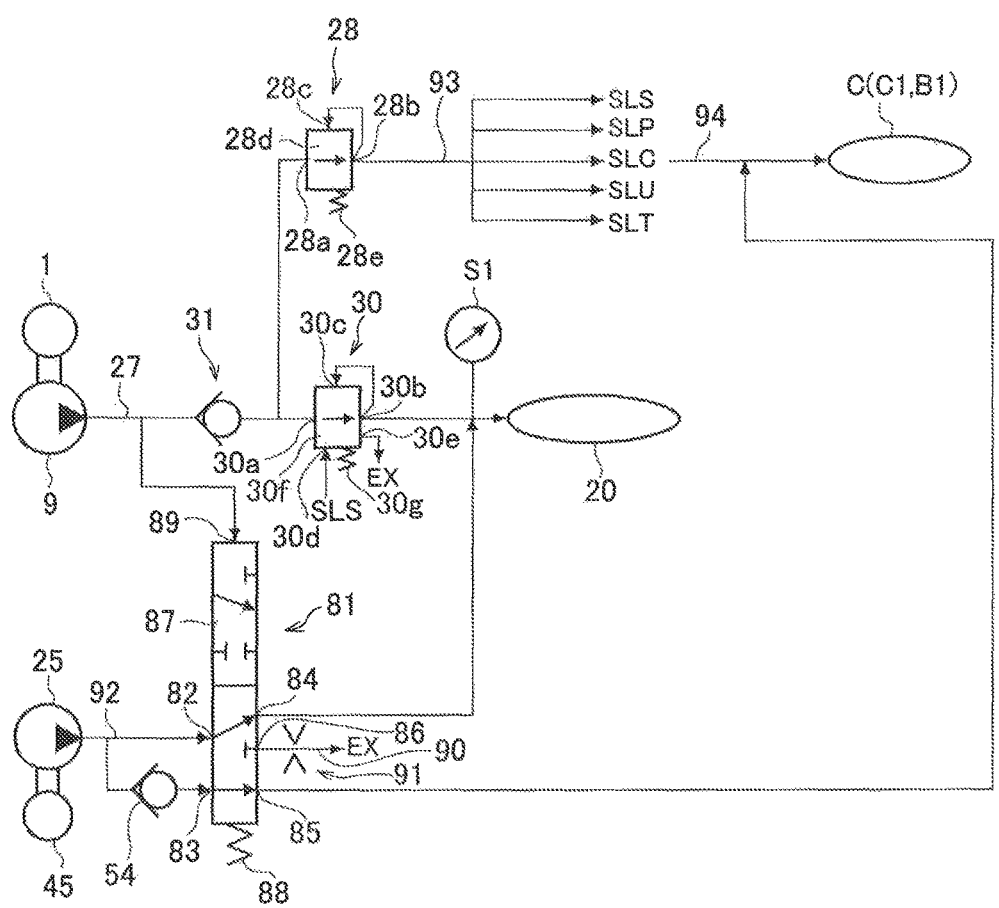
FIG. 8 is a hydraulic circuit diagram showing a modification example of the hydraulic control system shown in FIG. 6 configured to inhibit a back flow of the oil from the engagement device toward the electric oil pump.

Optionally, the oil discharged from the electric oil pump 25 may also be delivered to the output side of the linear solenoid valve SLC as the example shown in FIG. 3. Turning to FIG. 8, there is shown a modification example of the hydraulic control system in which the oil is allowed to be delivered from the electric oil pump 25 to the output side of the linear solenoid valve SLC. In the example shown in FIG. 8, the second output port 85 of the example shown in FIG. 6 is connected to the oil passage 94 in the output side of the linear solenoid valve SLC, and the check valve 54 is also disposed on the upstream side of the second input port 83 as the example shown in FIG. 3. In FIG. 8, the remaining structures are similar to the foregoing examples, and the common reference numerals are allotted to the common elements. Detailed explanation for those common elements will be omitted. In the hydraulic control system shown in FIG. 8, the second output port 83 is connected to the output side of the linear solenoid valve SLC. In order to prevent drainage of the oil from the engagement device C when the ignition switch is turned off so that a communication between the second input port 83 and the second output port 85 is established, the check valve 54 is disposed between the electric oil pump 25 and the second input port 83.

In the modification example in which the check valve 54 is thus arranged, when the oil is delivered from the electric oil pump 25 to the hydraulic actuator 20 and to the engagement device C, the hydraulic pressure applied to the engagement device C is equalized to the hydraulic pressure detected by the hydraulic pressure sensor S1. Specifically, when the hydraulic pressure applied to the engagement device C is higher than that applied to the hydraulic actuator 20, the hydraulic pressure applied to the engagement device C will not be increased but only the hydraulic pressure applied to the hydraulic actuator 20 is increased. However, oil leakage from the linear solenoid valve SLC and the engagement device C is caused inevitably thereby lowering the hydraulic pressure applied to the engagement device C. Accordingly, even when the hydraulic pressure applied to the engagement device C is higher than that applied to the hydraulic actuator 20, the hydraulic pressure applied to the engagement device C will be substantially equalized to that applied to the hydraulic actuator 20. By contrast, when the hydraulic pressure applied to the engagement device C is lower than that applied to the hydraulic actuator 20, the hydraulic pressure applied to the engagement device C is raised to almost same level as that maintained to be applied to the hydraulic actuator 20. Therefore, the hydraulic pressure applied to the engagement device C may also be judged by detecting the hydraulic pressure applied to the hydraulic actuator 20 by the hydraulic pressure sensor S1.

In addition, when the hydraulic pressure detected by the hydraulic pressure sensor S1 is higher than the target pressure of the engagement device C, the hydraulic pressure applied to the engagement device C can be controlled to achieve the target pressure by discharging the oil from the second control valve 30 while correcting the current value applied to the linear solenoid valve SLC. That is, the second control valve 30 can be used as a relief valve for controlling the hydraulic pressure applied to the engagement device C. Instead, the hydraulic pressure of the engagement device C may also be controlled to achieve the target pressure by discharging the oil from the linear solenoid valve SLC while correcting the current value applied thereto. In this case, the linear solenoid valve SLC serves as a relief valve to control the hydraulic pressure applied to the engagement device C.

Each switching valve 34, 55, 74 and 81 serves as the claimed switching valve respectively, the modulator valve 28, the second control valve 30, the third control valve 66 and the linear solenoid valve SLC serve as the claimed control valve respectively, and the orifice 49, 64 and 91 serve as the claimed second orifice respectively.

According to the present invention, the foregoing hydraulic control systems may be combined arbitrarily. For example, the hydraulic control systems according to the preferred examples may also be applied to a vehicle having a toroidal CVT or a geared transmission adapted to shift a gear stage by altering engagement states of clutches, instead of the above-explained vehicle having the belt-driven CVT. Further, the hydraulic control system according to the preferred examples may also be applied to a vehicle in which a starting clutch and the belt-driven CVT are arranged in series, instead of the vehicle having the above-explained powertrain. Furthermore, the hydraulic control system according to the preferred examples may also be applied to a vehicle in which a fuel-cutoff control is executed when the engine is stopped without bringing the vehicle into a neutral state, instead of the above-explained vehicle in which the S&S control is executed to stop the engine while bringing the vehicle into a neutral state by releasing the starting clutch.

REFERENCE SIGNS LIST

1: engine; 4: torque converter; 8: lockup clutch; 9: mechanical oil pump; 12: belt-driven continuously variable transmission; 19, 20: hydraulic actuator; 25: electric oil pump; 27, 33, 36, 39, 41, 43, 44, 46, 47, 56, 63, 65, 75, 76, 78, 80, 90, 92, 93, 94: oil passage; 28: modulator valve; 29: first control valve; 30: second control valve; 31, 54: check valve: 34, 55, 74, 81: switching valve: lubrication site; 37, 38, 49, 64, 91: orifice; 45: motor; 66: third control valve, C1, C2: clutch; B1: brake; SLS, SLP, SLC, SLU, SLT: linear solenoid valve.

The invention claimed is:
1. A hydraulic control system for vehicles, comprising:
a mechanical oil pump that is driven by a prime mover;
an electric oil pump that is driven by an output torque of an electric motor;
a control object that is controlled by an oil delivered from at least one of the mechanical oil pump and the electric oil pump; and
a switching valve that is adapted to provide a communication between the electric oil pump and a drain passage while inhibiting a delivery of the oil from the electric oil pump to the control object when an output pressure of the mechanical oil pump is higher than a predetermined level, and to provide a communication between the electric oil pump and the control object through a predetermined oil passage when an output pressure of the mechanical oil pump is lower than the predetermined level,
wherein the hydraulic control system is configured to discharge the oil from the electric oil pump before establishing the communication between the electric oil pump and the control object as a result of reduction in the output pressure of the mechanical oil pump to be lower than the predetermined level,
wherein the predetermined oil passage includes a first oil passage for delivering the oil delivered to the control object partially to a low pressure site where a required pressure is lower than that of the control object, and
wherein the switching valve is adapted to allow the oil discharged from the electric oil pump to flow toward the control object through the first oil passage while inhibiting a delivery of the oil to flow toward the low pressure site, when the output pressure of the mechanical oil pump falls below the predetermined level so that the communication between the electric oil pump and the control object through the first oil passage is established.

2. The hydraulic control system for vehicles as claimed in claim 1, further comprising:
a regulator valve that regulates hydraulic pressure applied to the control object, and an output side thereof is connected to the regulator valve;
a first orifice that reduces a flow rate of the oil flowing from the first oil passage to the low pressure site; and
a second oil passage that is connected to the mechanical oil pump and the regulator valve, and that allows the oil to be delivered to the low pressure site when a speed of the prime mover exceeds a predetermined speed.

3. The hydraulic control system for vehicles as claimed in claim 1, further comprising a second orifice that reduces a flow rate of the oil discharged from the electric oil pump being drained through the drain passage, when the output pressure of the mechanical oil pump is higher than the predetermined level.

4. The hydraulic control system for vehicles as claimed in claim 1, wherein the predetermined level is higher than a maximum required pressure of the control object.

5. The hydraulic control system for vehicles as claimed in claim 1, wherein the predetermined level is lower than a maximum pressure level to be established by the electric oil pump.

6. The hydraulic control system for vehicles as claimed in claim 1, wherein the control object includes an engagement device that is brought into engagement when starting the vehicle.

7. The hydraulic control system for vehicles as claimed in claim 6, further comprising a second check valve that is disposed on an oil passage connecting the electric oil pump to the switching valve to prevent back flow of the oil toward the electric oil pump.

8. The hydraulic control system for vehicles as claimed in claim 1, wherein the control object includes a hydraulic actuator adapted to change a speed ratio of a transmission in accordance with hydraulic pressure applied thereto, and to reduce the speed ratio by discharging the oil therefrom.

9. The hydraulic control system for vehicles as claimed in claim 1, further comprising:
a fluid coupling that transmits a torque hydraulically from the prime mover; and
a lockup clutch that is arranged in parallel to the fluid coupling to directly transmit the torque from the prime mover when brought into engagement;
wherein the control object includes a second linear solenoid valve adapted to control an engagement pressure of the lockup clutch in accordance with an electric current applied thereto.

10. The hydraulic control system for vehicles as claimed in claim 1, wherein the switching valve is actuated in accordance with an applied signal pressure established by the mechanical oil pump.

11. The hydraulic control system for vehicles as claimed in claim 10, wherein the switching valve includes a spool valve adapted to switch a connection among the first oil passage and a second oil passage depending on a balance between a load pushing a spool thereof based on the signal pressure and an elastic force counteracting said load.

12. The hydraulic control system for vehicles as claimed in claim 1, wherein the switching valve is actuated in accordance with an applied signal pressure established by the electric oil pump.

13. The hydraulic control system for vehicles as claimed in claim 1, wherein the hydraulic control system is configured to control an output pressure of the electric oil pump in accordance with a required pressure of the control object when the output pressure of the mechanical oil pump is lower than the predetermined level.

14. A hydraulic control system for vehicles, comprising:
a mechanical oil pump that is driven by a prime mover;
an electric oil pump that is driven by an output torque of an electric motor;
a control object that is controlled by an oil delivered from at least one of the mechanical oil pump and the electric oil pump;
a switching valve that is adapted to provide a communication between the electric oil pump and a drain passage while inhibiting a delivery of the oil from the electric oil pump to the control object when an output pressure of the mechanical oil pump is higher than a predetermined level, and to provide a communication between the electric oil pump and the control object through a predetermined oil passage when an output pressure of the mechanical oil pump is lower than the predetermined level; and
a control valve that controls hydraulic pressure applied to the control object based on an initial pressure established by the oil discharged from the mechanical oil pump,
wherein the hydraulic control system is configured to discharge the oil from the electric oil pump before establishing the communication between the electric oil pump and the control object as a result of reduction in the output pressure of the mechanical oil pump to be lower than the predetermined level, and
wherein the control valve is adapted to be opened to lower the hydraulic pressure applied to the control object when the hydraulic pressure applied to the control object is higher than the required pressure thereof during delivering the oil from the electric oil pump to the control object.

15. The hydraulic control system for vehicles as claimed in claim 14, further comprising:
a first check valve that is disposed on an oil passage connecting the mechanical oil pump to the control valve to prevent back flow of the oil toward the mechanical oil pump;
wherein the switching valve is adapted to establish a communication between an oil passage of an input side of the first check valve and an oil passage of an output side of the first check valve when the output pressure of the mechanical oil pump is higher than the predetermined level.

16. The hydraulic control system for vehicles as claimed in claim 14,
wherein the switching valve comprises
an input port connected to the electric oil pump,
a drain port that drains the oil discharged from the electric oil pump when the output pressure of the mechanical oil pump is lower than the predetermined level, and
an output port connected to an oil passage of an input side of the control valve;
wherein the control valve includes a first linear solenoid valve adapted to change an output pressure thereof in accordance with an electric current applied thereto; and
wherein the hydraulic control system further comprises a correction means configured to increase a current value applied to the first linear solenoid valve to control the hydraulic pressure applied to the control object when the hydraulic pressure applied thereto is low, to be larger than a current value applied to the first linear solenoid valve to control the hydraulic pressure applied to the control object when the hydraulic pressure applied thereto is high.

17. The hydraulic control system for vehicles as claimed in claim 16, wherein the correction means includes a means configured to increase a current value applied to the first linear solenoid valve to control the hydraulic pressure applied to the control object when the output pressure of the mechanical oil pump is lower than the predetermined level and therefore the electric oil pump delivers the oil to the control object, to be larger than the current value applied to the first linear solenoid valve to control the hydraulic pressure applied to the control object when the output pressure of the mechanical oil pump is higher than the predetermined level and therefore the mechanical oil pump delivers the oil to the control object.

18. The hydraulic control system for vehicles as claimed in claim 14, further comprising a second orifice that reduces a flow rate of the oil discharged from the electric oil pump being drained through the drain passage, when the output pressure of the mechanical oil pump is higher than the predetermined level.

19. The hydraulic control system for vehicles as claimed in claim 14, wherein the predetermined level is higher than a maximum required pressure of the control object.

20. The hydraulic control system for vehicles as claimed in claim 14, wherein the predetermined level is lower than a maximum pressure level to be established by the electric oil pump.

21. The hydraulic control system for vehicles as claimed in claim 14, wherein the control object includes an engagement device that is brought into engagement when starting the vehicle.

22. The hydraulic control system for vehicles as claimed in claim 21, further comprising a second check valve that is disposed on an oil passage connecting the electric oil pump to the switching valve to prevent back flow of the oil toward the electric oil pump.

23. The hydraulic control system for vehicles as claimed in claim 14, wherein the control object includes a hydraulic actuator adapted to change a speed ratio of a transmission in accordance with hydraulic pressure applied thereto, and to reduce the speed ratio by discharging the oil therefrom.

24. The hydraulic control system for vehicles as claimed in claim 14, further comprising:
a fluid coupling that transmits a torque hydraulically from the prime mover; and
a lockup clutch that is arranged in parallel to the fluid coupling to directly transmit the torque from the prime mover when brought into engagement;
wherein the control object includes a second linear solenoid valve adapted to control an engagement pressure of the lockup clutch in accordance with an electric current applied thereto.

25. The hydraulic control system for vehicles as claimed in claim 14, wherein the switching valve is actuated in accordance with an applied signal pressure established by the mechanical oil pump.

26. The hydraulic control system for vehicles as claimed in claim 25, wherein the switching valve includes a spool valve adapted to switch a connection among a plurality of oil passages depending on a balance between a load pushing a spool thereof based on the signal pressure and an elastic force counteracting said load.

27. The hydraulic control system for vehicles as claimed in claim 14, wherein the switching valve is actuated in accordance with an applied signal pressure established by the electric oil pump.

28. The hydraulic control system for vehicles as claimed in claim 14, wherein the hydraulic control system is configured to control an output pressure of the electric oil pump in accordance with a required pressure of the control object when the output pressure of the mechanical oil pump is lower than the predetermined level.

\* \* \* \* \*